United States Patent
Shigeno et al.

(10) Patent No.: US 10,837,982 B2
(45) Date of Patent: Nov. 17, 2020

(54) SCANNING PROBE MICROSCOPE AND SCANNING METHOD USING THE SAME

(71) Applicant: HITACHI HIGH-TECH SCIENCE CORPORATION, Tokyo (JP)

(72) Inventors: Masatsugu Shigeno, Tokyo (JP); Hiroyoshi Yamamoto, Tokyo (JP); Kazutoshi Watanabe, Tokyo (JP)

(73) Assignee: HITACHI HIGH-TECH SCIENCE CORPORATION, Tokyo (JP)

( * ) Notice: Subject to any disclaimer, the term of this patent is extended or adjusted under 35 U.S.C. 154(b) by 0 days.

(21) Appl. No.: 16/362,095

(22) Filed: Mar. 22, 2019

(65) Prior Publication Data

US 2019/0293681 A1    Sep. 26, 2019

(30) Foreign Application Priority Data

Mar. 26, 2018    (JP) .................................. 2018-057954

(51) Int. Cl.
*G01Q 30/02*    (2010.01)
(52) U.S. Cl.
CPC .................................. *G01Q 30/02* (2013.01)
(58) Field of Classification Search
USPC .......................................................... 850/50
See application file for complete search history.

(56) References Cited

U.S. PATENT DOCUMENTS

| | | | | |
|---|---|---|---|---|
| 7,607,342 B2* | 10/2009 | Huang | ................. | G01Q 10/065 73/105 |
| 8,458,810 B2* | 6/2013 | McConney | ............ | G01Q 60/58 850/1 |
| 2009/0133168 A1* | 5/2009 | Ando | ................... | G01Q 10/065 850/33 |
| 2010/0107284 A1* | 4/2010 | Shigeno | ................... | G01G 3/12 850/5 |
| 2013/0276175 A1* | 10/2013 | King | ..................... | B82Y 35/00 850/40 |
| 2017/0102407 A1* | 4/2017 | Baur | ...................... | G01Q 10/06 |

FOREIGN PATENT DOCUMENTS

| | | |
|---|---|---|
| JP | 2001033373 A | 2/2001 |
| JP | 2007085764 A | 4/2007 |
| JP | 2011209073 A | 10/2011 |

* cited by examiner

*Primary Examiner* — Kiet T Nguyen
(74) *Attorney, Agent, or Firm* — Holland & Hart LLP

(57) ABSTRACT

To avoid applying overload on both a probe and a sample surface, and to reduce time for measuring irregular shapes on the sample surface in performing an intermittent measurement method, provided is a scanning probe microscope including: a cantilever having a probe attached thereto, the scanning probe microscope being configured to scan a sample surface by intermittently bringing the probe into contact with the sample surface; and a control device configured to perform a first operation of bringing the probe and the sample surface into contact with each other, and a second operation of separating the probe and the sample surface from each other after the first operation. The control device executes the second operation by thermally deforming the cantilever.

11 Claims, 14 Drawing Sheets

SCANNING PROBE MICROSCOPE AND SCANNING METHOD USING THE SAME

CROSS REFERENCE TO RELATED APPLICATION

The present application claims priority to Japanese Patent Application No. JP 2018-057954, filed Mar. 26, 2018, the entire contents of which are incorporated herein for all purposes by this reference.

BACKGROUND OF THE INVENTION

1. Field of the Invention

The present invention relates to a scanning probe microscope and a scanning method using the same.

2. Description of the Related Art

In Japanese Patent Application Laid-open No. 2001-33373, there is disclosed a scanning probe microscope configured to continuously scan a probe, which is formed at a distal end of a cantilever, while maintaining the probe in contact with a sample, to thereby measure irregular shapes on a sample surface. It should be noted, however, that with the scanning probe microscope described in Japanese Patent Application Laid-open No. 2001-33373, the probe and the sample surface are always in contact with each other, and hence wearing down of the probe and damage to the sample may occur.

In contrast, in each of Japanese Patent Application Laid-open Nos. 2007-85764 and 2011-209073, there is proposed an intermittent measurement method of measuring irregular shapes of a sample surface by bringing a probe and the sample surface into contact with each other only at a plurality of preset measurement points on the sample surface to intermittently scan the sample surface. The "contact between the probe and the sample surface" in each of the patent documents refers to approaching to a distance at which a physical interaction occurs, and determining the contact based on a physical quantity of the interaction. Representative examples of the physical quantity include attractive force and repulsive force.

Specifically, in the intermittent measurement method, the probe is moved to approach the sample surface from above a predetermined measurement point, and the sample surface is intermittently scanned through repeated switching between a first step of bringing the probe into contact with the sample surface to measure a height of the probe, and a second step of separating the probe, which is in contact with the sample surface, from the sample surface and moving the probe to above a next measurement point after the first step. In actual measurement, a step of measuring a physical property between the probe and the sample, or a step of measuring the shape and the physical property at the same time is often performed between the first step and the second step.

As a result, in the above-mentioned intermittent measurement method, as compared to Japanese Patent Application Laid-open No. 2001-33373, the probe and the sample surface are brought into contact with each other only at the measurement points, with the result that minimal contact is required, and that wearing down of the probe and damage to the sample can be reduced.

Meanwhile, in the above-mentioned intermittent measurement method, an operation of separating the probe that is in contact with the sample surface is performed with a scanner using a piezoelectric element. However, the piezoelectric element has an inevitable lag in response, with the result that, in the piezoelectric element, no-response time occurs from when a signal for instructing start of the separating operation is acquired to when the separating operation is started, and the probe approaches the sample also in that time to apply a force of a set value or more. Therefore, in the intermittent measurement method, it is required to set an approach speed in consideration of the force of the set value or more, which is generated by the above-mentioned lag in response, and it is thus difficult to set an approach speed that is too fast. As a result, measurement time in which the irregular shapes on the sample surface are measured cannot be reduced, and hinders an increase in speed.

SUMMARY OF THE INVENTION

The present invention has been made in view of the above-mentioned circumstances, and therefore has an object to avoid applying overload on both a probe and a sample surface, and to reduce time for measuring irregular shapes on the sample surface in performing an intermittent measurement method.

According to one embodiment of the present invention, there is provided a scanning probe microscope including: a cantilever having a probe attached thereto, the scanning probe microscope being configured to scan a sample surface by intermittently bringing the probe into contact with the sample surface; and a control device configured to perform a first operation of bringing the probe and the sample surface into contact with each other, and a second operation of separating the probe and the sample surface from each other after the first operation, wherein the control device is configured to execute the second operation by thermally deforming the cantilever.

Further, in one embodiment of the present invention, in the above-mentioned scanning probe microscope, the control device includes a fine movement mechanism configured to relatively move the probe and the sample surface by using a piezoelectric element, and the control device is configured to execute the second operation by using both the thermal deformation of the cantilever and the fine movement mechanism.

Further, in one embodiment of the present invention, the above-mentioned scanning probe microscope further includes a first light illuminator configured to irradiate the cantilever with light, and the control device is configured to thermally deform the cantilever by controlling an illumination intensity of the light with which the first light illuminator irradiates the cantilever during the second operation.

Further, in one embodiment of the present invention, the above-mentioned scanning probe microscope further includes an optical lever displacement detector including a second light illuminator, which is configured to irradiate a first surface of the cantilever with laser light, to detect a displacement amount of the cantilever based on reflection of the laser light with which the second light illuminator irradiates the first surface, and the second light illuminator also serves as the first light illuminator.

Further, in one embodiment of the present invention, in the above-mentioned scanning probe microscope, the control device includes: a determiner configured to determine whether the probe and the sample surface are brought into contact with each other based on the displacement amount of the cantilever, which is detected by the optical lever displacement detector, during the first operation; and a controller configured to execute, after the determiner determines that the probe and the sample surface are brought into contact with each other, the second operation by setting an illumination intensity of the laser light of the second light illuminator weaker than an illumination intensity of the laser light in the first operation to thermally deform the cantilever.

Further, in one embodiment of the present invention, the above-mentioned scanning probe microscope further includes a light control element configured to control an illumination intensity of the laser light with which the second light illuminator irradiates the first surface, and the control device includes: a determiner configured to determine whether the probe and the sample surface are brought into contact with each other based on the displacement amount of the cantilever, which is detected by the optical lever displacement detector, during the first operation; and a controller configured to execute, after the determiner determines that the probe and the sample surface are brought into contact with each other, the second operation by controlling the light control element so that an illumination intensity of the laser light with which the second light illuminator irradiates the first surface is set weaker than an illumination intensity of the laser light in the first operation to thermally deform the cantilever.

Further, in one embodiment of the present invention, in the above-mentioned scanning probe microscope, the first surface of the cantilever has a coefficient of thermal expansion that is larger than a coefficient of thermal expansion of a second surface of the cantilever, which is on a side opposite to the first surface.

Further, in one embodiment of the present invention, in the above-mentioned scanning probe microscope, the cantilever includes a resistor, and the control device is configured to thermally deform the cantilever by energizing the resistor during the second operation.

Further, in one embodiment of the present invention, in the above-mentioned scanning probe microscope, the cantilever includes a piezoresistor, and the control device includes: a determiner configured to determine whether the probe and the sample surface are brought into contact with each other based on a value of resistance of the piezoresistor during the first operation; and a controller configured to execute, after the determiner determines that the probe and the sample surface are brought into contact with each other, the second operation by energizing and heating the piezoresistor to thermally deform the cantilever.

According to one embodiment of the present invention, there is provided a scanning method using a scanning probe microscope, the scanning probe microscope including a cantilever having a probe attached thereto to scan a sample surface by intermittently bringing the probe into contact with the sample surface, the scanning method including: a first operation step of bringing the probe and the sample surface into contact with each other; and a second operation step of separating the probe and the sample surface from each other after the first operation step, wherein the second operation step includes separating the probe and the sample surface from each other through use of thermal deformation of the cantilever.

As described above, according to the embodiments of the present invention, it is possible to avoid applying overload on both the probe and the sample surface, and to reduce time for measuring irregular shapes on the sample surface in performing the intermittent measurement method.

DESCRIPTION OF THE EMBODIMENTS

Figure 1:
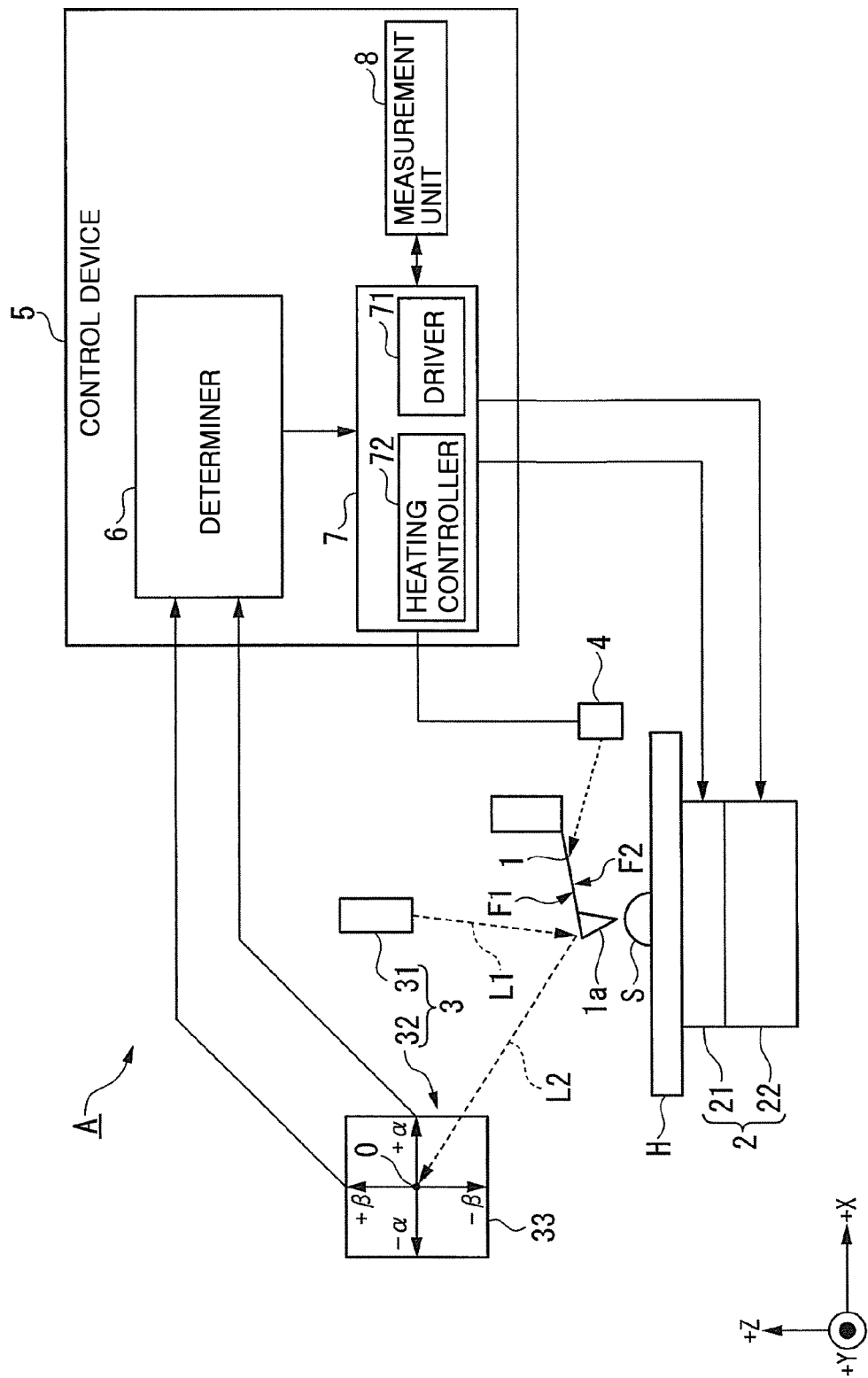
FIG. 1 is a diagram for illustrating an example of a schematic configuration of a scanning probe microscope (A) according to a first embodiment of the present invention.

A scanning probe microscope according to an embodiment of the present invention is a scanning probe microscope using a probe scanning method called an "intermittent measurement method", in which a probe is brought into contact with a sample surface to intermittently scan the sample surface with the probe.

Now, the scanning probe microscope according to an embodiment of the present invention is described with reference to the accompanying drawings. In the drawings, the same or similar parts are denoted by the same reference symbols, and duplicate description may be omitted. Moreover, a shape, a size, and the like of an element in the drawings may be emphasized for clearer description.

First Embodiment

FIG. 1 is a diagram for illustrating an example of a schematic configuration of a scanning probe microscope A according to a first embodiment of the present invention. As illustrated in FIG. 1, the scanning probe microscope A includes a cantilever 1, a movement driver 2, a displacement detector 3, a heating device 4, and a control device 5.

The cantilever 1 includes a probe 1a at a distal end thereof. The cantilever 1 is fixed at a proximal end thereof, and the distal end is a free end. The cantilever 1 is an elastic lever member having a small spring constant K, and when the probe 1a at the distal end and a surface (hereinafter referred to as the "sample surface") of a sample S are brought into contact with each other, the cantilever 1 is deformed in accordance with a pressing force, with which the probe 1a at the distal end presses the sample surface.

Moreover, when the probe 1a at the distal end and the sample surface are brought into contact with each other, and when the sample surface is inclined, the cantilever 1 is twisted or deformed in accordance with the inclination of the sample surface, and support reaction of a support, which is a contact point between the probe 1a at the distal end and the sample surface.

The movement driver 2 is a fine movement mechanism capable of moving the probe 1a and the sample S relatively in three-dimensional directions. The movement driver 2 includes a Z-direction drive unit 21 (driver) and an XY scanner 22 (scanning unit).

A sample stage H is placed on the Z-direction drive unit 21. The sample S is placed on the sample stage H to be opposed to the probe 1a of the cantilever 1.

The Z-direction drive unit 21 is configured to move the sample stage H in a direction (Z direction) perpendicular to a horizontal plane. The Z-direction drive unit 21 is a piezoelectric element, for example.

The Z-direction drive unit 21 is configured to move the sample stage H in the Z direction under control of the control device 5, to thereby perform an operation of bringing the sample surface closer to the probe 1a, or an operation of moving the sample S in a direction of being separated from the probe 1a.

The XY scanner 22 is configured to move the probe 1a and the sample S relatively with respect to XY directions under control of the control device 5. In FIG. 1, a plane parallel to a surface of the sample stage H is the horizontal plane, and is herein defined as an "XY plane" by two orthogonal axes X and Y. For example, the XY scanner 22 is a piezoelectric element.

The Z-direction drive unit 21 and the XY scanner 22 may be arranged in any relationship as long as the configuration is capable of relatively scanning a three-dimensional shape for observation. In other words, the cantilever or the sample may be scanned.

The displacement detector 3 is configured to detect a deformation amount and a twist amount of the cantilever 1. For example, the displacement detector 3 detects the deformation amount and the twist amount of the cantilever 1 with the use of an optical lever method.

The displacement detector 3 includes a light illuminator 31 and a photodetector 32.

The light illuminator 31 is configured to irradiate a reflecting surface (not shown) formed on a back surface (first surface) F1 of the cantilever 1 with laser light L1. The "back surface (first surface) F1" as used herein is a surface on a side opposite to a front surface (second surface) F2 of the cantilever 1, on which the probe 1a is arranged.

The photodetector 32 is configured to receive laser light L2 reflected by the above-mentioned reflecting surface. The photodetector 32 is a photodetector including quadrant receiving surfaces 33 configured to receive the laser light L2 reflected by the reflecting surface. The laser light L2 reflected by the reflecting surface of the cantilever 1 enters the plurality of receiving surfaces 33, which are quarters of the photodetector 32. For example, a position of the photodetector 32 is adjusted such that the laser light L2 reflected by the reflecting surface of the cantilever 1 enters the receiving surfaces 33 at near the center thereof.

Figure 2:
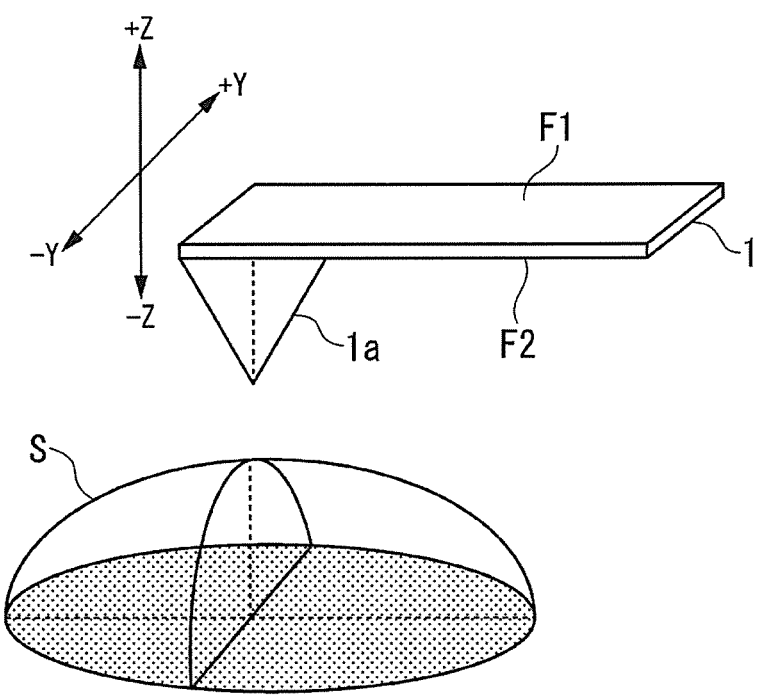
FIG. 2 is a perspective view of a sample (S) having a slope and a cantilever (1) in the first embodiment.

Now, a method of detecting the deformation amount and the twist amount of the cantilever 1 in the first embodiment is described with reference to FIG. 1 and FIG. 2. FIG. 2 is a perspective view of the sample S having a slope, and the cantilever 1.

The cantilever 1 is displaced in any one or both of the Z direction and a Y direction when the probe 1a and the sample surface are brought into contact with each other. In the first embodiment, the displacement of the cantilever 1 that occurs in the Z direction is referred to as the "deformation amount", and the displacement of the cantilever 1 that occurs in the Y direction is referred to as the "twist amount". For example, in initial conditions, an incident spot position of the laser light L2 that is reflected under a state in which no force is applied on the probe 1a, on the receiving surfaces 33 of the photodetector 32, is a center position O of the receiving surfaces 33. The "state in which no force is applied on the probe 1a" is a state in which, because the probe 1a and the sample surface are not in contact with each other, the cantilever is not deformed by a force at the time of contact, for example.

In a contact mode, when the probe 1a and the sample surface are brought into contact with each other, the force is applied on the probe 1a, with the result that the deformation amount and the twist amount are generated in the cantilever 1. Therefore, a reflected spot position of the laser light L2 reflected by the reflecting surface of the cantilever 1 having the deformation amount and the twist amount generated therein is displaced from the center position O. Thus, the scanning probe microscope A can detect a magnitude and a direction of the force applied on the probe 1a by capturing a movement direction of the spot position on the receiving surfaces 33 of the photodetector 32.

For example, in FIG. 1, when the twist amount is generated in the cantilever 1, a change in spot position in an $\alpha$ direction can be captured on the receiving surfaces 33 of the photodetector 32. Moreover, when the deformation amount is generated in the cantilever 1, a change in spot position in a $\beta$ direction can be captured on the receiving surfaces 33.

In this case, an amount of change in spot position from the center position O depends on the twist amount and the deformation amount. Specifically, when the cantilever 1 is deformed in a +Z direction, the reflected spot of the laser light L2 on the receiving surfaces 33 of the photodetector 32 is changed in a +$\beta$ direction. Similarly, when the cantilever 1 is deformed in a −Z direction, the reflected spot of the laser light L2 on the receiving surfaces 33 of the photodetector 32 is changed in a −$\beta$ direction. Meanwhile, when the twist amount is generated in the cantilever 1 in a +Y direction, the reflected spot position of the laser light L2 on the receiving surfaces 33 of the photodetector 32 is changed in a +$\alpha$ direction. Similarly, when the twist amount is generated in the cantilever 1 in a −Y direction, the reflected spot of the laser light L2 on the receiving surfaces 33 of the photodetector 32 is changed in a −$\alpha$ direction.

The photodetector 32 outputs a first detection signal corresponding to the reflected spot position of the laser light L2 in the ±Z directions of the receiving surfaces 33 to the control device 5. In other words, the first detection signal is a DIF signal (deformation signal) corresponding to the deformation amount of the cantilever 1. Moreover, the photodetector 32 outputs a second detection signal corresponding to the reflected spot position of the laser light L2 in the ±Y directions of the receiving surfaces 33 to the control device 5. In other words, the second detection signal is an FFM signal (twist signal) corresponding to the twist amount of the cantilever 1.

Returning to FIG. 1, the heating device 4 is driven by the control device 5 to change a temperature of the cantilever 1. The heating device 4 may have any configuration as long as the cantilever 1 can be heated, and a heating method thereof is not particularly limited. For example, the heating device 4 can heat the cantilever 1 by a method described below.

Figure 3:
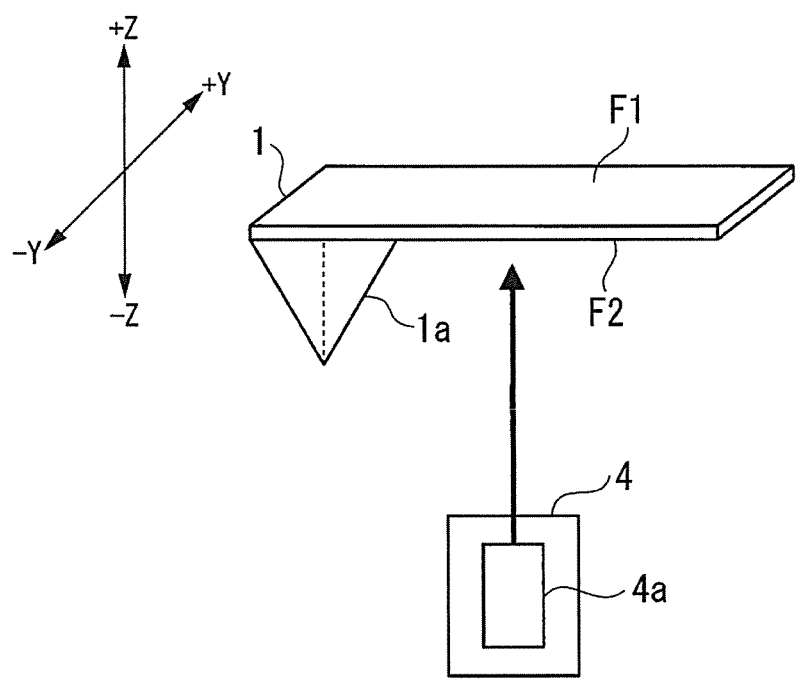
FIG. 3 is a diagram for illustrating a configuration of a light heating method of a heating device (4) in the first embodiment.

For example, as illustrated in FIG. 3, the heating device 4 may include a light illuminator 4a to heat the front surface F2 of the cantilever 1 by irradiating the front surface F2 of the cantilever 1 with the laser light, an infrared ray, or other such light from the light illuminator 4a on the basis of a signal (hereinafter referred to as a "heating signal") from the control device 5. The method of heating the cantilever 1 by irradiating the cantilever 1 with the light is hereinafter referred to as a "light heating method".

Figure 4:
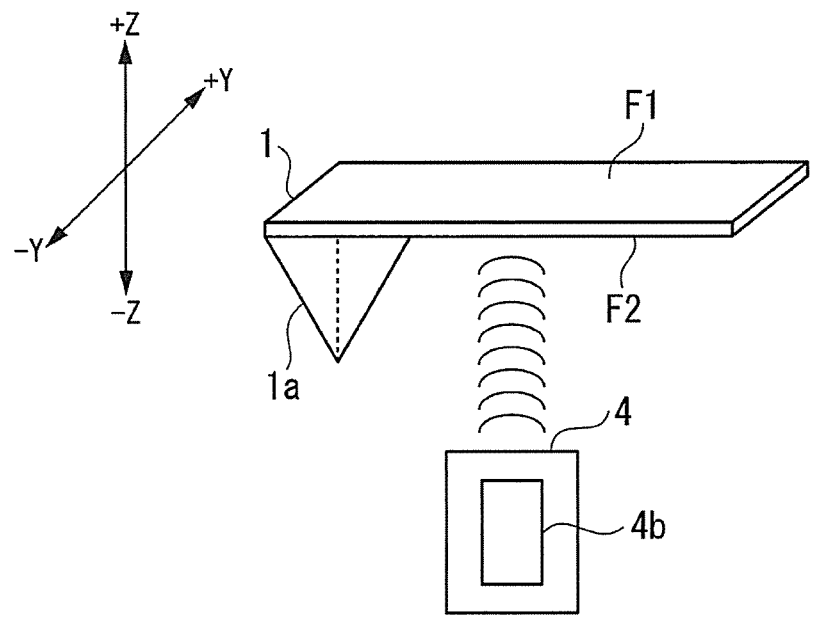
FIG. 4 is a diagram for illustrating a configuration of a microwave heating method of the heating device (4) in the first embodiment.

Alternatively, as illustrated in FIG. 4, the heating device 4 may include a microwave illuminator 4b capable of applying microwave to heat the front surface F2 of the cantilever 1 by irradiating the front surface F2 of the cantilever 1 with the microwave from the microwave illuminator 4b on the basis of the heating signal from the control device 5. The method of heating the cantilever 1 by irradiating the cantilever 1 with the microwave is hereinafter referred to as a "microwave heating method".

Figure 5:
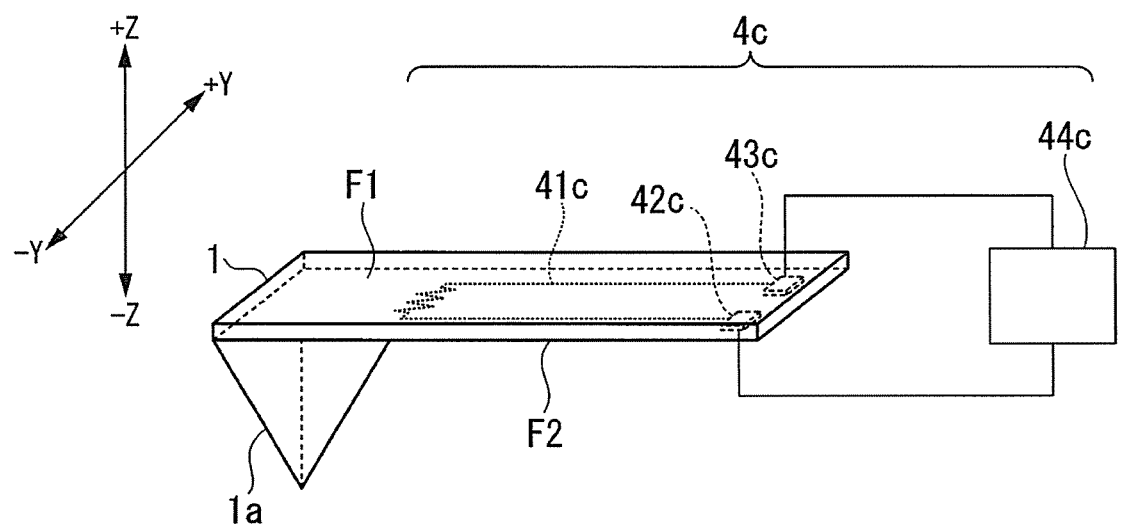
FIG. 5 is a diagram for illustrating a first configuration of an energization heating method of the heating device (4) in the first embodiment.

Still alternatively, as illustrated in FIG. 5, the heating device 4 may energize and heat the cantilever 1 by energizing the cantilever 1. For example, the heating device 4 includes a resistor 41c, a first electrode 42c, a second electrode 43c, and a voltage applicator 44c.

The resistor 41c is included in the cantilever 1. For example, the resistor 41c is a conductive member including a resistor capable of generating heat, and is formed on the cantilever 1.

The first electrode 42c is provided on the front surface F2 of the cantilever 1, and is electrically connected to a first end of the resistor 41c.

The second electrode 43c is provided on the front surface F2 of the cantilever 1, and is electrically connected to a second end of the resistor 41c.

The voltage applicator 44c is configured to generate heat by applying a predetermined voltage between the first electrode 42c and the second electrode 43c to allow an electric current to flow through the resistor 41c on the basis of the heating signal from the control device 5. As a result, the cantilever 1 is heated.

Figure 6:
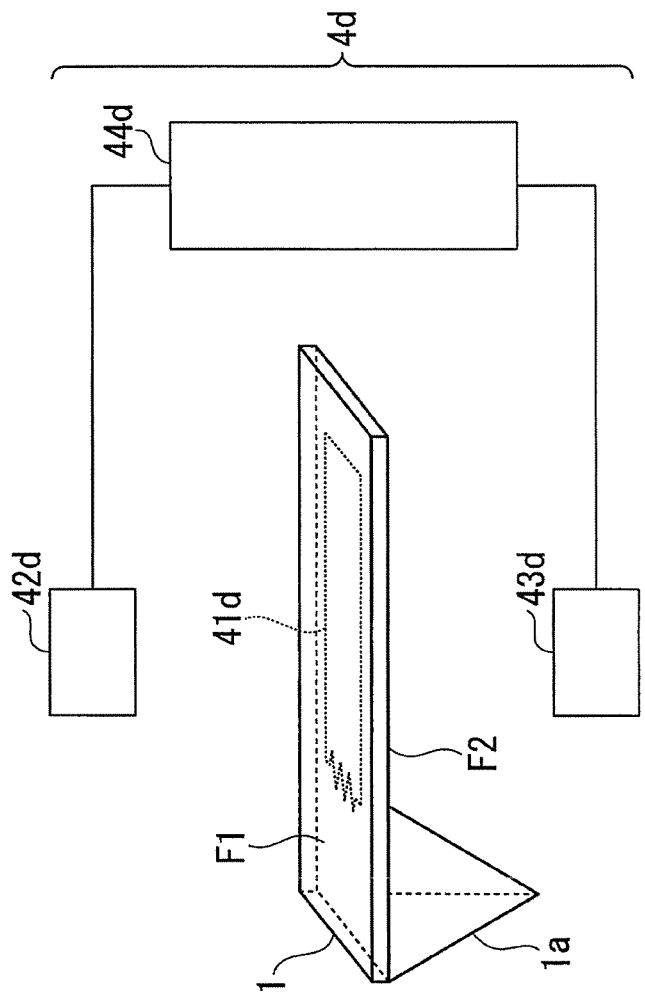
FIG. 6 is a diagram for illustrating a second configuration of the energization heating method of the heating device (4) in the first embodiment.

Yet alternatively, as illustrated in FIG. 6, the heating device 4 may energize and heat the cantilever 1 by generating an induced current in the cantilever 1 by electromagnetic induction. For example, the heating device 4 includes a current circuit 41d, a first electrode 42d, a second electrode 43d, and a voltage applicator 44d.

The current circuit 41d is a circuit including a resistor, and is provided to the cantilever 1.

The first electrode 42d is provided on the back surface F1 side of the cantilever 1.

The second electrode 43d is provided on the front surface F2 side of the cantilever 1.

The voltage applicator 44d is configured to cause the electric current to flow through the resistor by applying an AC voltage between the first electrode 42c and the second electrode 43c on the basis of the heating signal from the control device 5 to generate the induced current in the current circuit 41d. As a result, the front surface F2 of the cantilever 1 is heated.

The first electrode 42d and the second electrode 43d may each be an electromagnet instead of an electrode.

Next, the control device 5 in the first embodiment is described.

As illustrated in FIG. 1, the control device 5 includes a determiner 6, a controller 7, and a measurement unit 8.

The determiner 6 is configured to determine whether the probe 1a is brought into contact with the sample surface on the basis of the first detection signal and the second detection signal, which are output from the photodetector 32. In the following description, the processing of determining whether the probe 1a is brought into contact with the sample surface is referred to as "contact determination processing".

Moreover, the determiner 6 is configured to determine whether the probe 1a is separated from the sample surface on the basis of the first detection signal and the second detection signal, which are output from the photodetector 32. In the following description, the processing of determining whether the probe 1a is separated from the sample surface is referred to as "separation determination processing".

The controller 7 is configured to control a relative movement amount between the probe 1a and the sample S. The scanning probe microscope A according to an embodiment of the present invention uses the intermittent measurement method, in which the sample surface is intermittently scanned by bringing the probe 1a into contact with only a plurality of preset measurement points on the sample surface. Therefore, the controller 7 is configured to control each of the following operations: an approaching operation (first operation) of bringing the probe 1a closer to a measurement position; a separating operation (second operation) of separating the probe 1a and the sample S from each other; and a movement operation of moving the probe 1a to above the next measurement position.

Now, a configuration of the controller 7 is described. The controller 7 includes a driver 71 and a heating controller 72.

The driver 71 is configured to control the movement driver 2 to move the probe 1a and the sample S relatively with respect to the three-dimensional directions.

Specifically, in order to bring the probe 1a and the sample surface into contact with each other, the driver 71 outputs an approaching operation signal to the Z-direction drive unit 21 to elevate the sample S. As a result, the controller 7 can bring the probe 1a and the sample surface closer to each other.

Moreover, in order to separate the probe 1a and the sample surface from each other, the driver 71 outputs a separating operation signal to the Z-direction drive unit 21 to lower the sample S. As a result, the driver 71 can move the sample surface in the direction of being separated from the probe 1a.

Further, the controller 7 outputs a drive signal to the XY scanner 22 to move the probe 1a to a measurement descending position, which is located immediately above the next measurement position.

The heating controller 72 is configured to control output of the heating device 4. Specifically, the heating controller 72 controls the output of the heating device 4 to control deformation of the cantilever 1 due to a change in temperature thereof. The deformation of the cantilever 1 due to the change in temperature thereof is referred to as "thermal deformation of the cantilever 1".

For example, the heating controller 72 outputs the heating signal to the heating device 4 to drive the heating device 4. As a result, the front surface F2 of the cantilever 1 is heated by the heating device 4 to thermally expand as the thermal deformation (that is, the cantilever 1 is deformed in the direction of being separated from the sample S). In contrast, the heating controller 72 stops outputting the heating signal to the heating device 4 to stop driving the heating device 4. As a result, the heating of the cantilever 1 by the heating device 4 is stopped, and the front surface F2 of the cantilever 1 is reduced in temperature to be contracted as the thermal deformation (that is, the cantilever 1 is deformed in the direction of approaching the sample S).

The measurement unit 8 is configured to measure irregular shapes on the sample surface under a state in which the probe 1a and the sample surface are in contact with each other. For example, when it is determined in the contact determination processing that the probe 1a is brought into contact with the sample surface, the measurement unit 8 measures a distance (hereinafter simply referred to as "relative distance") by which the sample S is moved relatively to the probe 1a in the approaching operation, to thereby measure the irregular shapes on the sample surface. For example, the measurement unit 8 may calculate the relative distance on the basis of a voltage value of the drive signal under the state in which the probe 1a and the sample surface are in contact with each other. Alternatively, the measurement unit 8 may directly measure displacement of the sample stage H by a sensor (not shown), or may directly measure a height of the sample stage H by a sensor (not shown). Moreover, the operation of determining that the probe 1a is brought into contact with the sample surface in the contact determination processing, and the operation of measuring the relative distance may be performed in parallel, to thereby measure irregular shapes on the sample surface on the basis of the relative distance at the time when it is determined that the probe 1a is brought into contact with the sample surface.

Figure 7:
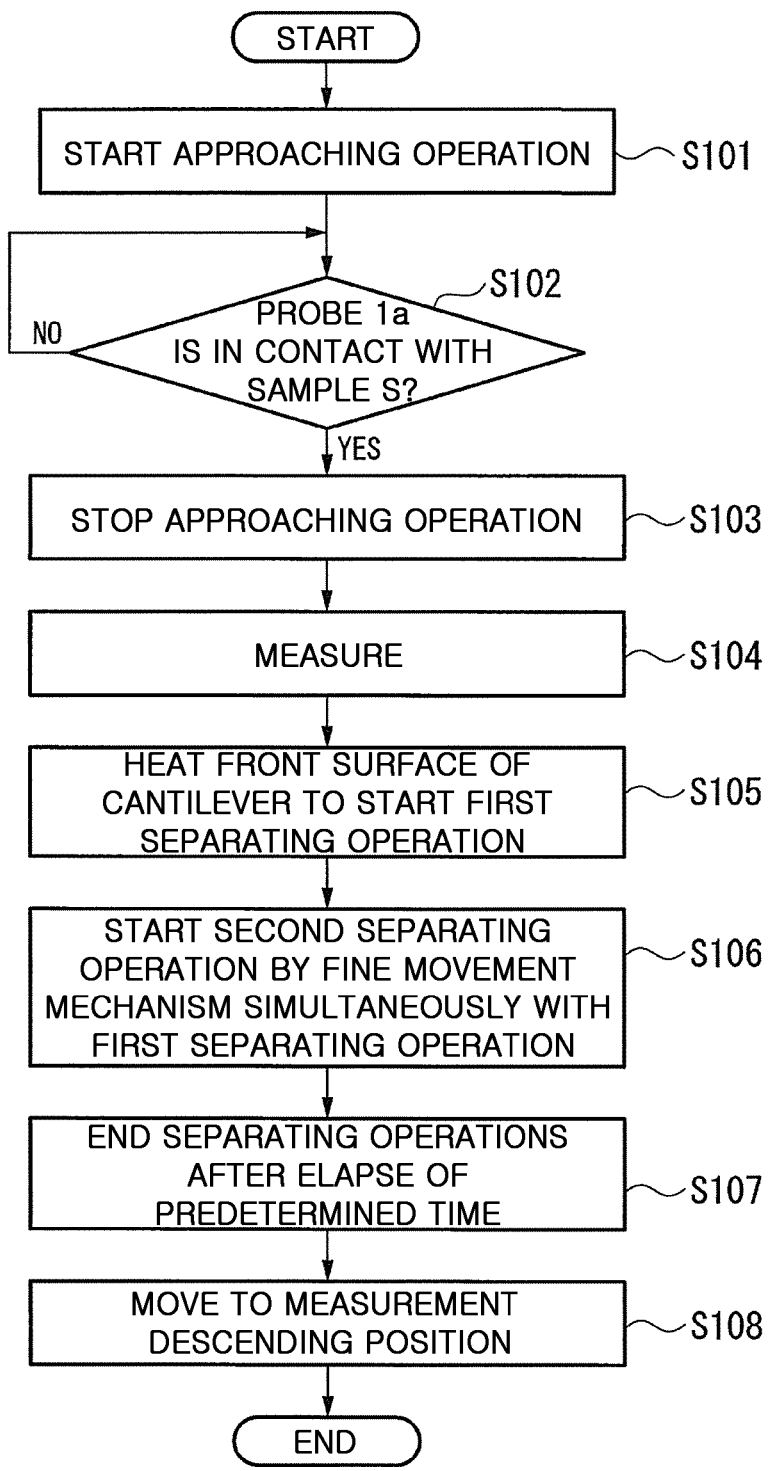
FIG. 7 is a flowchart for illustrating a flow of an intermittent measurement method of the scanning probe microscope (A) according to the first embodiment.

Next, a flow of the intermittent measurement method of the scanning probe microscope A according to the first embodiment is described with reference to FIG. 7. As the initial conditions, a case is assumed in which the probe 1a is positioned at a measurement descending position of a predetermined measurement point.

The driver 71 starts the approaching operation by outputting the approaching operation signal to the Z-direction drive unit 21 to elevate the sample stage H (Step S101).

When the approaching operation is started by the driver 71, the determiner 6 executes the contact determination processing, in which it is determined whether the probe 1a is brought into contact with the sample surface on the basis of the first detection signal and the second detection signal, which are output from the photodetector 32 (Step S102).

Now, the contact determination processing in the first embodiment is described.

When the deformation amount indicated by the first detection signal output from the photodetector 32 exceeds a first range, the determiner 6 determines that the probe 1a is brought into contact with the sample surface. Moreover, when the twist amount indicated by the second detection signal output from the photodetector 32 exceeds a second range, the determiner 6 determines that the probe 1a is brought into contact with the sample surface.

As described above, when at least one of a first condition, in which the deformation amount indicated by the first detection signal output from the photodetector 32 exceeds the first range, or a second condition, in which the twist amount indicated by the second detection signal output from the photodetector 32 exceeds the second range, is satisfied, the determiner 6 determines that the probe 1a is brought into contact with the sample surface. Although there has been described above the example in which the first detection signal and the second detection signal are determined independently, the determination may be performed on the basis of a set value corresponding to characteristics. For example, "the square of the first detection signal" and "the square of the second detection signal" may be added to each other in the determiner 6, and when a positive value of a square root of the sum is a predetermined value or more, it may be determined that the probe 1a is brought into contact with the sample surface.

When it is determined in the above-mentioned contact determination processing that the probe 1a is brought into contact with the sample surface, the driver 71 stops outputting the approaching operation signal to stop the approaching operation (Step S103). In this case, the probe 1a is in contact with the sample surface, and hence the cantilever is twisted or deformed by a predetermined amount or more. Then, the measurement unit 8 measures the irregular shapes on the sample surface by measuring the relative distance under the state in which the approaching operation is stopped (Step S104). Alternatively, the operation of determining by the contact determination processing that the probe 1a is brought into contact with the sample surface, and the operation of measuring the relative distance may be performed in parallel, and the irregular shapes on the sample surface may be measured on the basis of the relative distance at the time when it is determined that the probe 1a is brought into contact with the sample surface.

When the measurement of the relative distance by the measurement unit 8 is complete, the controller 7 starts the separating operation, in which the sample S and the probe 1a are separated from each other. Specifically, the heating controller 72 controls the output of the heating device 4 so as to thermally deform the cantilever 1, to thereby start the separating operation (Step S105).

Specifically, in starting the separating operation, the heating controller 72 outputs a drive signal to the heating device 4. When acquiring the drive signal from the heating controller 72, the heating device 4 heats the front surface F2 of the cantilever 1. As a result, the front surface F2 of the cantilever 1 is heated and expanded, and the cantilever 1 is thermally deformed to be warped upward (+Z) toward the back surface F1 side. Therefore, the separating operation is started with this thermal deformation.

A response speed of the thermal deformation is far faster than a response speed of the piezoelectric element. In other words, a response speed of a separating operation (first separating operation) through the thermal deformation of the cantilever 1 is far faster than a response speed of a separating operation (second separating operation) by the Z-direction drive unit 21 (fine movement mechanism). Therefore, in the first embodiment, the separating operation is started through use of not the Z-direction drive unit 21 but the thermal deformation of the cantilever 1, to thereby reduce measurement time of the irregular shapes on the sample surface.

At the same time with the start of the first separating operation through the thermal deformation of the cantilever 1, the driver 71 starts the second separating operation, in which the sample S is moved in the direction of being separated from the probe 1a, by outputting a separating operation signal to the Z-direction drive unit 21 (Step S106). Even when both of the separations are started simultaneously, the operation is performed as follows: the separation through the thermal deformation, which is fast in response, leads, and the separation with the fine movement mechanism, which is slow in response, follows. Both of the above-mentioned separating operations are executed for predetermined time, and are then ended (Step S107). The "predetermined time" is up to a timing when the Z fine movement mechanism responds by an amount that is equivalent to the deformation amount of the thermal deformation or more.

When the separating operation is stopped, the controller 7 outputs the drive signal to the XY scanner 22, to thereby move the probe 1a to the measurement descending position located immediately above the next measurement position (Step S108). Then, the controller 7 performs the operation of from Step S101 to Step S108 also at the next measurement position. In other words, the scanning probe microscope A performs the operation of from Step S101 to Step S109 for each measurement point on the sample S, to thereby intermittently scan the sample surface.

Next, effects of the first embodiment are described.

In the scanning probe microscope configured to perform the intermittent measurement method in the contact mode, the approaching operation and the separating operation are executed at each measurement position. Therefore, in the intermittent measurement method, an increase in measurement time of the irregular shapes becomes more problematic than in the method in which the probe are scanned continuously to measure the irregular shapes on the sample surface.

To address this problem, in the intermittent measurement method, in order to reduce the measurement time of the irregular shapes, it is required to perform the approaching operation and the separating operation at high speed. It should be noted, however, that in the related-art method in which the approaching operation and the separating operation are performed with the fine movement mechanism, that is, the piezoelectric element, delay in response of the piezoelectric element hinders the reduction in above-mentioned measurement time.

More specifically, generally in the intermittent measurement method, the separating operation is performed at a time point when the probe and the sample surface are brought into contact with each other during the approaching operation, and when a force applied on the cantilever reaches a target value (F0). It should be noted, however, that from when it is detected that the force applied on the cantilever reaches the target value to when the separating operation is actually started, that is, until when the probe and the sample surface start moving in the direction of being separated from each other, a time difference (delay in response) ΔT (msec) occurs. Therefore, a force F (nN) exceeding a force of the target value is generated, and the probe is further pressed into the sample surface by the force F. When an approach speed between the probe and the sample surface is represented by V (nm/msec), and the spring constant of the cantilever is represented by K (N/m), the force F (nN) can be expressed as the following relational expression (1) by the Hooke's law.

$$F(\text{nN}) = V(\text{nm/msec}) \times \Delta T(\text{msec}) \times K(\text{N/m}) \quad (1)$$

As a method of reducing the measurement time of the irregular shapes in the intermittent measurement method, there is a method of simply increasing the approach speed V. It should be noted, however, that with that method, as is clear from the above-mentioned relational expression (1), when the approach speed V is increased, the force F is increased, and when a state in which F0<<F is established, damage to the probe or deformation of the sample may occur. Therefore, when it is attempted to suppress the force F to a predetermined value in order to prevent the damage to the probe and the deformation of the sample, the approach speed V cannot be increased, and the measurement time cannot be reduced with the related-art method.

For example, in the scanning probe microscope, it is assumed that a general cantilever having a spring constant of 40 N/m is used, and that a force (F+F0: provided that F>>F0) with which the damage to the probe or the deformation of the sample can be prevented is 10 nN or less. In this case, in the related-art method in which the approaching operation and the separating operation are performed by the piezoelectric element, an upper limit of a contact speed is estimated.

In general, in a case of a tube PZT piezoelectric element, a delay in response ΔT of about 0.2 msec occurs. Moreover, even with a stacked PZT piezoelectric element, which operates at high speed, a delay in response ΔT of about 0.04 msec occurs. Therefore, on the basis of the relational expression (1), an upper limit of the approach speed V is "1.25 nm/msec" for the tube PZT piezoelectric element, and "6.25 nm/msec" for the stacked PZT piezoelectric element.

In contrast, in the intermittent measurement method in the first embodiment, the separating operation is executed with the use of not the piezoelectric element but the thermal deformation of the cantilever 1. In the scanning probe microscope A, time from when it was detected that the force applied on the cantilever 1 reached the target value to when the cantilever 1 was thermally deformed was 0.1 μsec in an Example. In other words, time from when it is detected that the force applied on the cantilever 1 reaches the target value to when the separating operation is actually started, that is, the delay in response ΔT is 0.1 μsec. Therefore, when a spring constant K=40 N/m, and when the force (F+F0: provided that F>>F0)=10 nN, the approach speed V=2,500 nm/msec, and the approaching operation can be performed at a speed that is 2,000 times the speed of the tube PZT piezoelectric element, and 400 times the speed of the stacked PZT piezoelectric element. As a result, the scanning probe microscope A can significantly reduce the measurement time as compared to the related art.

As described above, the scanning probe microscope A according to the first embodiment executes the separating operation by thermally deforming the cantilever 1. As a result, the scanning probe microscope A can significantly reduce the measurement time as compared to the related art.

Alternatively, the scanning probe microscope A may execute the separating operation with the use of both the thermal deformation of the cantilever 1 and the fine movement mechanism (movement driver 2). In the first embodiment, the cantilever 1 is thermally deformed to execute the first separating operation, and then the second separating operation by the fine movement mechanism is executed. However, the present invention is not limited thereto. For example, the first separating operation and the second separating operation may be executed simultaneously.

Moreover, the cantilever 1 may be formed of a single material (for example, Si), or the back surface F1 and the front surface F2 may be formed of materials having different expansion coefficients. For example, in the scanning probe microscope A, the front surface F2 is thermally deformed by being heated, and hence the cantilever 1 may be configured such that a coefficient of thermal expansion of the front surface F2 is larger than the expansion coefficient of the back surface F1, for example. The front surface F2 may be set to have a coefficient of thermal expansion that is larger than that of the back surface F1 through formation of a layer of a good conductor having a coefficient of thermal expansion that is larger than that of the back surface F1 on the front surface F2 of the cantilever 1, for example. Specifically, the back surface F1 is formed of Si, and the front surface F2 is formed of Al.

Second Embodiment

Now, a scanning probe microscope B according to a second embodiment of the present invention is described with reference to the drawings. The scanning probe microscope B according to the second embodiment is different from that of the first embodiment in that, in performing the separating operation, the heating device 4 heats not the front surface F2 but the back surface F1 of the cantilever 1.

Figure 8:
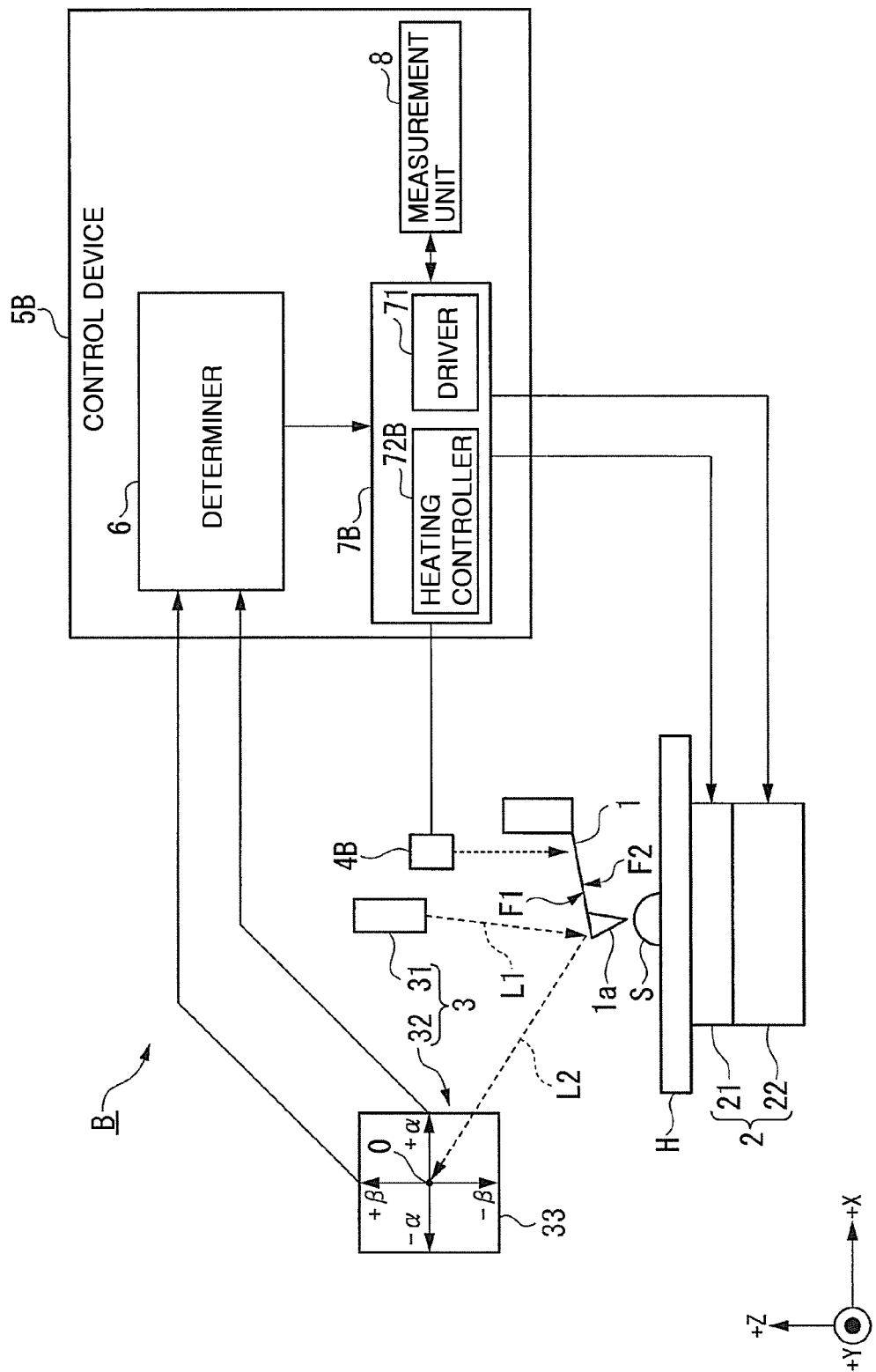
FIG. 8 is a diagram for illustrating an example of a schematic configuration of a scanning probe microscope (B) according to a second embodiment of the present invention.

FIG. 8 is a diagram for illustrating an example of a schematic configuration of the scanning probe microscope B according to the second embodiment. As illustrated in FIG. 8, the scanning probe microscope B includes a cantilever 1, a movement driver 2, a displacement detector 3, a heating device 4B, and a control device 5B.

The heating device 4B is configured to heat the back surface F1 of the cantilever 1. The heating device 4B may have any configuration as long as the cantilever 1 can be heated, and a heating method thereof is not particularly limited. For example, as in the first embodiment, the heating device 4B may heat the back surface F1 of the cantilever 1 by a light heating method or a microwave method. Alternatively, the heating device 4B may energize and heat the front surface F2 of the cantilever 1. For example, the heating device 4 includes a resistor 41c, a first electrode 42c, a second electrode 43c, and a voltage applicator 44c. It should be noted, however, that in this case, the resistor 41c, the first electrode 42c, and the second electrode 43c are provided on the back surface F1 of the cantilever 1. Still alternatively, the heating device 4B may energize and heat the cantilever 1 by generating an induced current in the front surface F2 of the cantilever 1 by electromagnetic induction. For example, the heating device 4 includes a current circuit 41d, a first electrode 42d, a second electrode 43d, and a voltage applicator 44d. It should be noted, however, that in this case, the current circuit 41d is provided on the back surface F1 of the cantilever 1.

Next, the control device 5B in the second embodiment is described.

As illustrated in FIG. 8, the control device 5B includes a determiner 6, a controller 7B, and a measurement unit 8.

The controller 7B is configured to control a relative movement amount between the probe 1a and the sample S. As in the first embodiment, the scanning probe microscope B uses an intermittent measurement method, in which the sample surface is intermittently scanned by bringing the probe 1a into contact with only a plurality of preset measurement points on the sample surface. Therefore, the controller 7B is configured to control each of the following operations: an approaching operation of bringing the probe 1a closer to a measurement position; a separating operation of separating the probe 1a and the sample S from each other; and a movement operation of moving the probe 1a to above the next measurement position.

Now, a configuration of the controller 7B in the second embodiment is described. The controller 7B includes a driver 71 and a heating controller 72B.

The heating controller 72B is configured to control output of the heating device 4B. Specifically, the heating controller 72B controls the output of the heating device 4B to control deformation of the cantilever 1 due to a change in temperature thereof.

For example, the heating controller 72B outputs the heating signal to the heating device 4B to drive the heating device 4B. As a result, the back surface F1 of the cantilever 1 is heated by the heating device 4 to thermally expand as the thermal deformation (that is, the cantilever 1 is deformed in the direction of approaching the sample S). In contrast, the heating controller 72B stops outputting the heating signal to the heating device 4B to stop driving the heating device 4. As a result, the heating of the cantilever 1 by the heating device 4B is stopped, and the front surface F2 of the cantilever 1 is contracted as the thermal deformation (that is, the cantilever 1 is deformed in the direction of being separated from the sample S).

Figure 9:
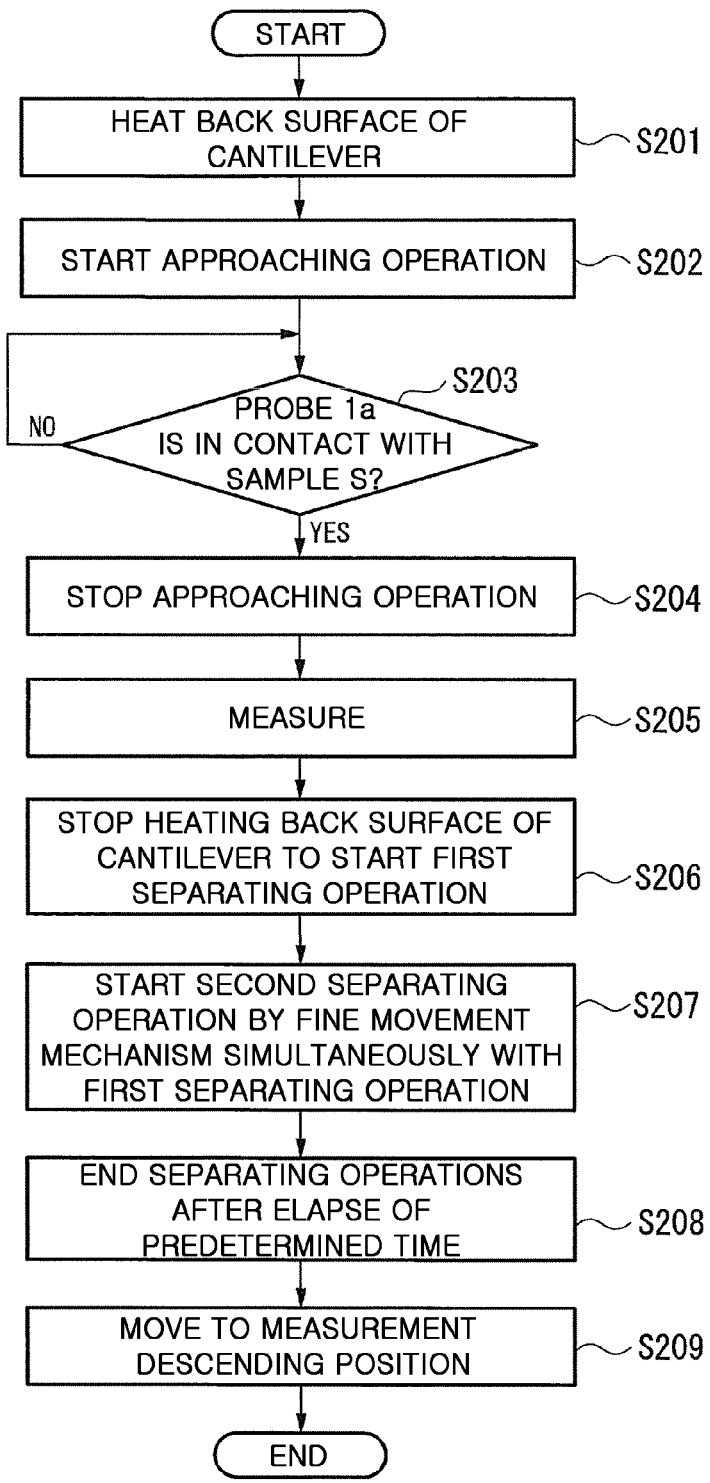
FIG. 9 is a flowchart for illustrating a flow of an intermittent measurement method of the scanning probe microscope (B) according to the second embodiment.

Now, a flow of the intermittent measurement method of the scanning probe microscope B according to the second embodiment is described with reference to FIG. 9. As the initial conditions, a case is assumed in which the probe 1a is positioned at a measurement descending position of a predetermined measurement point.

First, before starting the approaching operation, the controller 7B heats and thermally deforms the back surface F1 of the cantilever 1. In other words, the heating controller 72B controls the output of the heating device 4B so as to thermally deform the cantilever 1 (Step S201).

Specifically, the heating controller 72B outputs a drive signal to the heating device 4B. When acquiring the drive signal from the heating controller 72B, the heating device 4B heats the back surface F1 of the cantilever 1. As a result, the back surface F1 of the cantilever 1 is heated and expanded, and the cantilever 1 is thermally deformed to be bent downward (−Z) toward the front surface F2 side.

Under the state in which the cantilever 1 is thermally deformed downward (−Z) toward the front surface F2 side, the driver 71 outputs an approaching operation signal to the Z-direction drive unit 21 to start the approaching operation (Step S202).

When the approaching operation is started by the driver 71, the determiner 6 executes the contact determination processing, in which it is determined whether the probe 1a is brought into contact with the sample surface, on the basis of the first detection signal and the second detection signal, which are output from the photodetector 32 (Step S203). The contact determination processing in the second embodiment is similar to that in the first embodiment, and hence description thereof is omitted.

When it is determined in the above-mentioned contact determination processing that the probe 1a is brought into contact with the sample surface, the driver 71 stops outputting the approaching operation signal to stop the approaching operation (Step S204). In this case, the probe 1a is in contact with the sample surface, and hence the cantilever is twisted or deformed by a predetermined amount or more. Then, the measurement unit 8 measures the relative distance under the state in which the approaching operation is stopped, to thereby measure the irregular shapes on the sample surface (Step S205).

When the measurement of the relative distance by the measurement unit 8 is complete, the controller 7B controls the output of the heating device 4B so as to stop heating the cantilever 1, to thereby start the separating operation (Step S206).

Specifically, in starting the separating operation, the heating controller 72B stops outputting the drive signal to the heating device 4B. Therefore, when the drive signal from the heating controller 72B disappears, the heating device 4B stops heating the back surface F1 of the cantilever 1. As a result, the expanded back surface F1 of the cantilever 1 is contracted, and the cantilever 1 is thermally deformed upward (+Z) toward the back surface F1 side. Therefore, the separating operation (first separating operation) is started through the thermal deformation.

A response speed of the separating operation (first separating operation) through the thermal deformation of the cantilever 1 is far faster than a response speed of the separating operation (second separating operation) by the Z-direction drive unit 21 (fine movement mechanism). Therefore, in the second embodiment, the separating operation is started through use of not the Z-direction drive unit 21 but the thermal deformation of the cantilever 1, which is caused by the reduction in temperature, to thereby reduce measurement time of the irregular shapes on the sample surface.

With the reduction in temperature of the back surface F1, the cantilever 1 is thermally deformed. At the same time with the start of the first separating operation with the thermal deformation, the driver 71 outputs the separating operation signal to the Z-direction drive unit 21 to start the second separating operation, in which the sample S is moved in the direction of being separated from the probe 1a (Step S207). Even when both of the separation operations are started at the same time, separation through the thermal deformation, which is fast in response, leads, and the separation with the fine movement mechanism, which is slow in response, follows. Both of the above-mentioned separating operations are executed for the predetermined time, and are then ended (Step S208). The "predetermined time" is up to a timing when the Z fine movement mechanism responds by an amount that is equivalent to the deformation amount of the thermal deformation or more.

When the separating operation is stopped, the controller 7B outputs the drive signal to the XY scanner 22, to thereby move the probe 1a to the measurement descending position located immediately above the next measurement position (Step S209). Then, the controller 7B performs the operation of from Step S201 to Step S209 also at the next measurement position. In other words, the scanning probe microscope B performs the operation of from Step S201 to Step S209 for each measurement point on the sample S, to thereby intermittently scan the sample surface.

As described above, the scanning probe microscope B according to the second embodiment executes the separating operation by thermally deforming the cantilever 1. As a result, the scanning probe microscope B attains an effect of significantly reducing the measurement time as in the first embodiment.

Moreover, in the scanning probe microscope B, the cantilever 1 may be configured such that the expansion coefficient of the back surface F1 is larger than a coefficient of thermal expansion of the front surface F2, for example. As a result, the separating operation is enhanced not only by the thermal expansion due to temperature gradient of the heated back surface F1 in the cantilever 1 but also by a bimetallic effect, and fast separating operation over a long distance can be performed. In this case, instead of heating the back surface F1 of the cantilever 1, the entire cantilever 1 may be heated.

Moreover, the cantilever 1 in the second embodiment may be formed of a single material (for example, Si), or the back surface F1 and the front surface F2 may be formed of materials having different expansion coefficients. For example, the cantilever 1 in the second embodiment may be configured such that a coefficient of thermal expansion of the back surface F1 is larger than the expansion coefficient of the front surface F2. The back surface F1 may be set to have a coefficient of thermal expansion that is larger than that of the front surface F2 through formation of a layer of a good conductor having a coefficient of thermal expansion that is larger than that of the front surface F2 on the back surface F1 of the cantilever 1, for example. Specifically, the back surface F1 is formed of Al, and the front surface F2 is formed of Si.

Moreover, when starting the separating operation, the heating controller 72B stops outputting the drive signal to the heating device 4B. However, the present invention is not limited thereto. For example, when starting the separating operation, instead of stopping outputting the heating device 4B, the heating controller 72B may lower the output of the heating device 4B than during the approaching operation.

Third Embodiment

Now, a scanning probe microscope C according to a third embodiment of the present invention is described with reference to the drawings. The scanning probe microscope C according to the third embodiment is different from the embodiments described above in that the heating device 4 is not provided, and in that the cantilever 1 is thermally deformed by the light illuminator 31.

Figure 10:
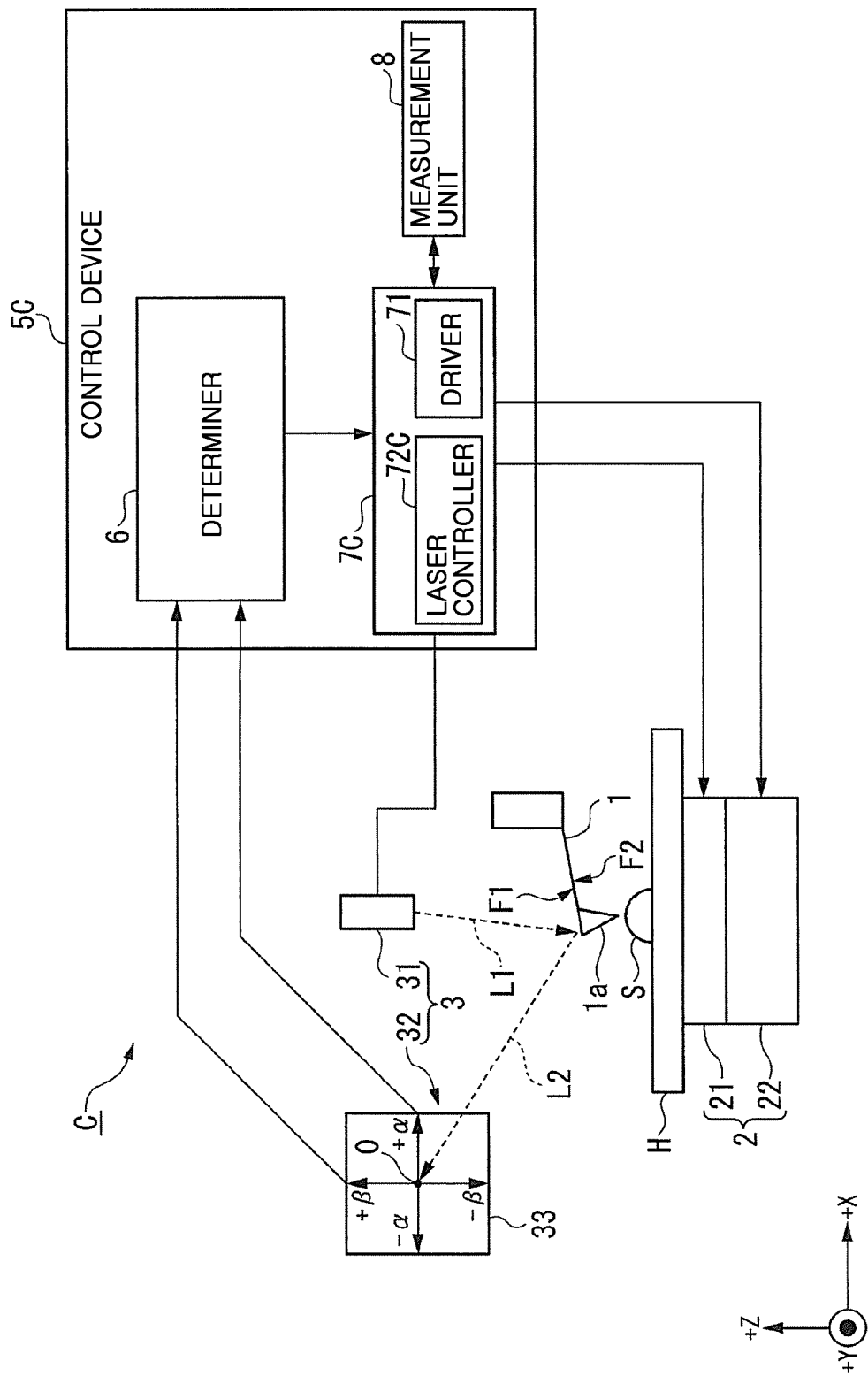
FIG. 10 is a diagram for illustrating an example of a schematic configuration of a scanning probe microscope (C) according to a third embodiment of the present invention.

FIG. 10 is a diagram for illustrating an example of a schematic configuration of the scanning probe microscope C according to the third embodiment. As illustrated in FIG. 10, the scanning probe microscope C includes a cantilever 1, a movement driver 2, a displacement detector 3, and a control device 5C.

The control device 5C includes a determiner 6, a controller 7C, and a measurement unit 8.

The controller 7C is configured to control an illumination intensity of the light illuminator 31.

Moreover, the controller 7C is configured to control a relative movement amount between the probe 1a and the sample S. As in the first embodiment, the scanning probe microscope C uses an intermittent measurement method, in which the sample surface is intermittently scanned by bringing the probe 1a into contact with only a plurality of preset measurement points on the sample surface. Therefore, the controller 7C is configured to control each of the following operations: an approaching operation of bringing the probe 1a closer to the measurement position; a separating operation of separating the probe 1a and the sample S from each other; and a movement operation of moving the probe 1a to above the next measurement position.

Now, a configuration of the controller 7C in the third embodiment is described. The controller 7C includes a driver 71 and a laser controller 72C.

The laser controller 72C is configured to control output of the light illuminator 31, to thereby control an illumination intensity of laser light L1 applied by the light illuminator 31. In this case, the light illuminator 31 irradiates the back surface (first surface) F1 of the cantilever 1 with the laser light L1. Therefore, the back surface F1 of the cantilever 1 is heated by the laser light L1. Thus, the laser controller 72C can change a temperature of the back surface F1 of the cantilever 1 to thermally deform the back surface F1 by increasing or reducing the illumination intensity of the laser light L1. In other words, the laser controller 72C controls the output of the light illuminator 31 to control the deformation of the cantilever 1 due to the change in temperature thereof.

Figure 11:
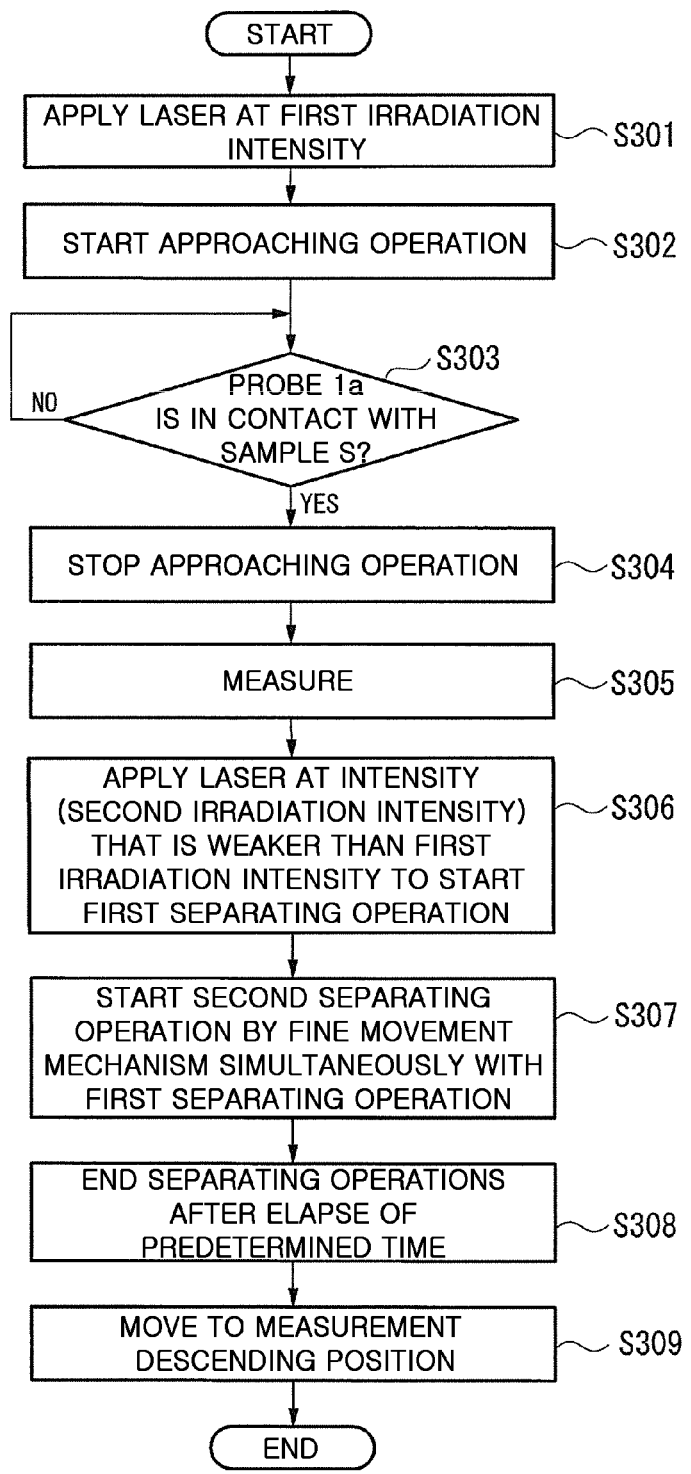
FIG. 11 is a flowchart for illustrating a flow of an intermittent measurement method of the scanning probe microscope (C) according to the third embodiment.

Next, a flow of the intermittent measurement method of the scanning probe microscope C according to the third embodiment is described with reference to FIG. 11. As the initial conditions, a case is assumed in which the probe $1a$ is positioned at a measurement descending position of a predetermined measurement point.

The laser controller 72C controls the output of the light illuminator 31 to control the illumination intensity of the laser light L1 applied by the light illuminator 31 to a first illumination intensity (Step S301). As a result, the laser light L1 of the first illumination intensity, which is applied by the light illuminator 31, is reflected by the back surface F1 of the cantilever 1 to enter the receiving surfaces 33 of the photodetector 32 at near the center thereof. Further, the back surface F1 of the cantilever 1 is heated by the laser light L1 of the first illumination intensity, which is applied by the light illuminator 31. As a result, the back surface F1 of the cantilever 1 is heated and expanded, and the cantilever 1 is thermally deformed to be bent downward (−Z) toward the front surface F2 side.

Under the state in which the cantilever 1 is thermally deformed downward (−Z) toward the front surface F2 side, the driver 71 outputs an approaching operation signal to the Z-direction drive unit 21 to start the approaching operation (Step S302).

When the approaching operation is started by the driver 71, the determiner 6 executes the contact determination processing, in which it is determined whether the probe $1a$ is brought into contact with the sample surface, on the basis of the first detection signal and the second detection signal, which are output from the photodetector 32 (Step S303). The contact determination processing in the third embodiment is similar to that in the first embodiment, and hence description thereof is omitted.

When it is determined in the above-mentioned contact determination processing that the probe $1a$ is brought into contact with the sample surface, the driver 71 stops outputting the approaching operation signal to stop the approaching operation (Step S304). In this case, the probe $1a$ is in contact with the sample surface, and hence the cantilever is twisted or deformed by a predetermined amount or more. Then, the measurement unit 8 measures the relative distance under the state in which the approaching operation is stopped, to thereby measure the irregular shapes on the sample surface (Step S305).

When the measurement of the relative distance by the measurement unit 8 is complete, the laser controller 72C controls the output of the light illuminator 31 to weaken the illumination intensity of the laser light L1, which is applied by the light illuminator 31, from the first illumination intensity to a second illumination intensity. In other words, when starting the separating operation, the laser controller 72C weakens the illumination intensity of the laser light L1, which is applied by the light illuminator 31, from the first illumination intensity to the second illumination intensity. As a result, the back surface F1 of the cantilever 1 that has been expanded is contracted with a reduction in temperature. In other words, the cantilever 1 is thermally deformed upward (+Z) toward the back surface F1 side. Therefore, the separating operation (first separating operation) is started with this thermal deformation (Step S306).

A response speed of the separating operation (first separating operation) through the thermal deformation of the cantilever 1 is far faster than a response speed of the separating operation (second separating operation) by the Z-direction drive unit 21 (fine movement mechanism). Therefore, in the third embodiment, the separating operation is started through use of not the Z-direction drive unit 21 but the thermal deformation of the cantilever 1, which is caused by the reduction in temperature, to thereby reduce measurement time of the irregular shapes on the sample surface.

With the reduction in temperature of the back surface F1, the cantilever 1 is thermally deformed. At the same time with the start of the first separating operation with the thermal deformation, the driver 71 outputs the separating operation signal to the Z-direction drive unit 21 to start the second separating operation, in which the sample S is moved in the direction of being separated from the probe $1a$ (Step S307). Even when both of the separation operations are started at the same time, separation through the thermal deformation, which is fast in response, leads, and the separation with the fine movement mechanism, which is slow in response, follows. Both of the above-mentioned separating operations are executed for the predetermined time, and are then ended (Step S308). The "predetermined time" is up to a timing when the Z fine movement mechanism responds by an amount that is equivalent to the deformation amount of the thermal deformation or more.

When the separating operation is stopped, the controller 7C outputs the drive signal to the XY scanner 22, to thereby move the probe $1a$ to the measurement descending position located immediately above the next measurement position (Step S309). Then, the controller 7C performs the operation of from Step S301 to Step S309 also at the next measurement position. In other words, the scanning probe microscope C performs the operation of from Step S301 to Step S309 for each measurement point on the sample S, to thereby intermittently scan the sample surface.

As described above, the scanning probe microscope C according to the third embodiment executes the separating operation by thermally deforming the cantilever 1. As a result, the scanning probe microscope C attains an effect of significantly reducing the measurement time as in the first embodiment.

Moreover, in the scanning probe microscope C according to the third embodiment, the heating device 4 is not provided, and the cantilever 1 is thermally deformed with the light illuminator 31, which is an optical lever light source. In other words, in the scanning probe microscope C, the light illuminator 31 also serves as the light illuminator $4a$ for heating to form both of an optical lever optical path and an optical path for heating the cantilever 1. As a result, it is not required to add the heating device 4 to thermally deform the cantilever 1, and cost is thus reduced.

Moreover, in the third embodiment, not a base of the cantilever 1 but the distal end of the cantilever 1 is heated with light. Therefore, the back surface F1 of the cantilever 1 can be heated with a higher temperature, and hence large thermal deformation can be generated.

Moreover, when the cantilever 1 is irradiated with the laser light to heat the cantilever 1, an amount of heat required to thermally deform the cantilever 1 by the heating is changed depending on the spring constant of the cantilever 1. Therefore, the illumination intensity of the laser light, which is applied by the light illuminator $4a$, may be determined depending on the spring constant of the cantilever 1.

Moreover, in the scanning probe microscope C, for example, the cantilever 1 may be configured such that the expansion coefficient of the back surface F1 is larger than a coefficient of thermal expansion of the front surface F2. As a result, the separating operation is enhanced not only by the thermal expansion due to temperature gradient of the heated back surface F1 in the cantilever 1 but also by the bimetallic effect, and fast separating operation over a long distance can be performed. In this case, instead of heating the back surface F1 of the cantilever 1, the entire cantilever 1 may be heated.

For example, the back surface F1 may be set to have a coefficient of thermal expansion that is larger than that of the front surface F2 through formation of a layer of a good conductor having a coefficient of thermal expansion that is larger than that of the elastic lever member on the back surface F1 of the cantilever 1.

Moreover, the back surface F1 may be set to have a coefficient of thermal expansion that is larger than that of the front surface F2 through formation of a layer of a good conductor having a coefficient of thermal expansion that is smaller than that of the elastic lever member on the front surface F2 of the cantilever 1.

Modification Example of Third Embodiment

As a modification example of the third embodiment, there may be included a light control element 91 configured to control the illumination intensity of the laser light L1 with which the reflecting surface of the back surface (first surface) F1 of the cantilever 1 is irradiated by the light illuminator 31. In this case, the illumination intensity of the laser light L1 is controlled by the light control element 91, and hence the output of the light illuminator 31 may be constant. In other words, in the modification example of the third embodiment, it is not required to control the output of the light illuminator 31 by the laser controller 72C as opposed to the third embodiment. A scanning probe microscope C' according to the modification example of the third embodiment and the scanning probe microscope C according to the third embodiment are identical in that the heating device 4 is not provided, and in that the cantilever 1 is thermally deformed with the light illuminator 31. It should be noted, however, that in the scanning probe microscope C according to the third embodiment, the output of the light illuminator 31 is controlled to change the illumination intensity of the laser light L1 and thermally deform the cantilever 1, while the scanning probe microscope C' according to the modification example of the third embodiment is different in that the output of the light illuminator 31 is set constant, and in that the illumination intensity of the laser light L1 is changed by the light control element 91 to thermally deform the cantilever 1. Other operation of the intermittent measurement method of the scanning probe microscope C' is similar to the operation of the intermittent measurement method of the scanning probe microscope C.

Figure 12:
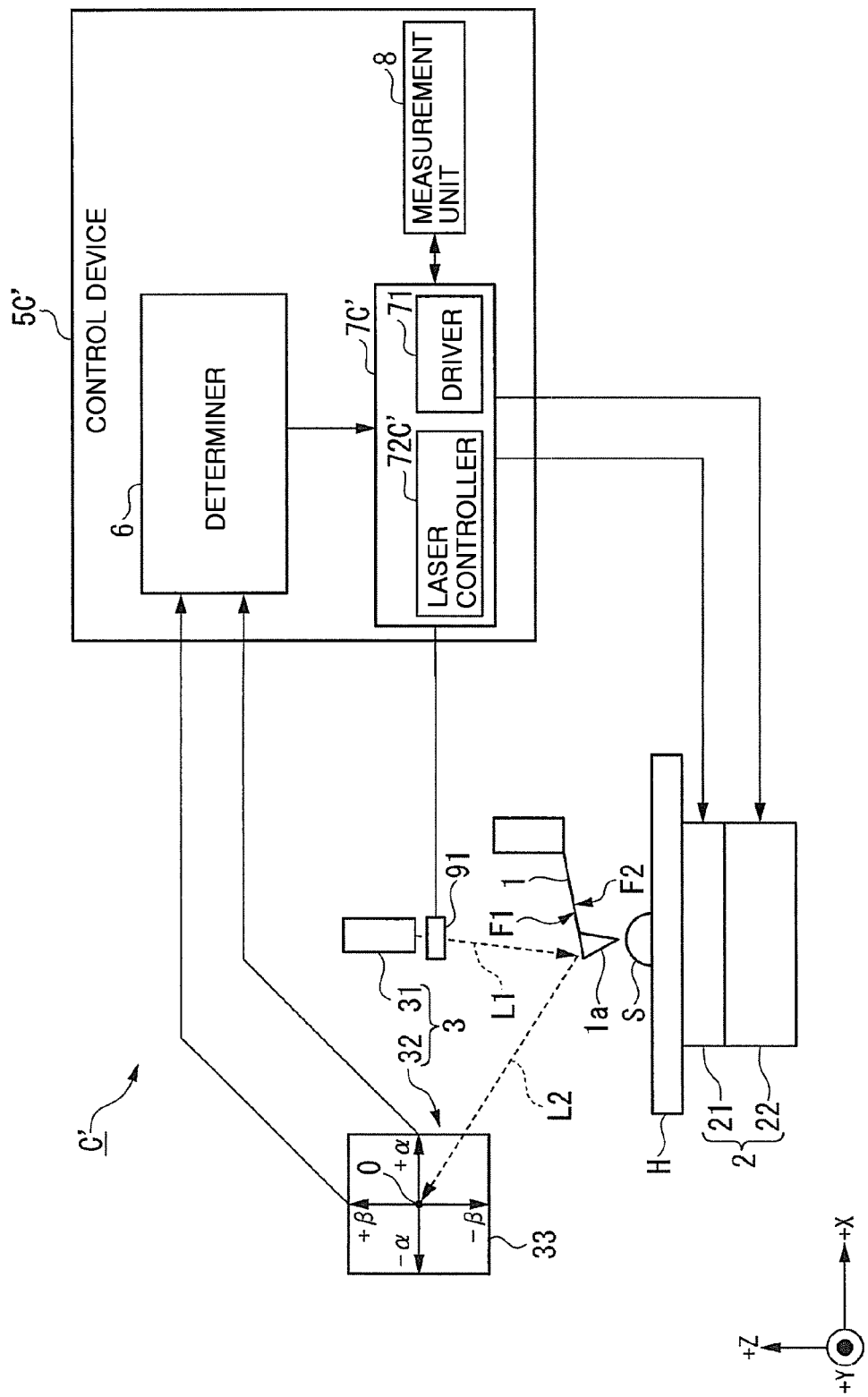
FIG. 12 is a diagram for illustrating an example of a schematic configuration of a scanning probe microscope (C') according to a modification example of the third embodiment.

Specifically, as illustrated in FIG. 12, the scanning probe microscope C' includes a cantilever 1, a movement driver 2, a displacement detector 3, a light control element 91, and a control device 5C'.

The light control element 91 is configured to control the illumination intensity of the laser light L1 with which the reflecting surface of the back surface (first surface) F1 of the cantilever 1 is irradiated by the light illuminator 31, and is an acousto-optic modulator or an electro-optic modulator, for example.

The control device 5C' includes a determiner 6, a controller 7C', and a measurement unit 8. The controller 7C' includes a driver 71 and a laser controller 72C'.

The laser controller 72C' is configured to output a control signal to the light control element 91, to thereby control and drive the light control element 91 and control the illumination intensity of the laser light L1. In other words, the light control element 91 can change the temperature of the back surface F1 of the cantilever 1 to deform the back surface F1 by increasing or reducing the intensity of the laser light L1, which is applied by the light illuminator 31, in accordance with the control signal from the laser controller 72C'. In this manner, the light control element 91 controls the intensity of the laser light L1, which is applied by the light illuminator 31, to control the deformation of the cantilever 1 due to the change in temperature thereof.

Specifically, when executing the first separating operation after the determiner 6 determines that the probe 1a is brought into contact with the sample surface, the light control element 91 weakens the illumination intensity of the laser light L1, which is applied by the light illuminator 31, from the first illumination intensity to the second illumination intensity in accordance with the control signal from the laser controller 72C'. As a result, the back surface F1 of the cantilever 1 that has been expanded is contracted with a reduction in temperature. In other words, the cantilever 1 is thermally deformed upward (+Z) toward the back surface F1 side. Therefore, as in the third embodiment, the first separating operation is started with this thermal deformation.

As a result, as compared to the third embodiment, the illumination intensity of the laser light L1, which is applied by the light illuminator 31, can be controlled more easily.

Fourth Embodiment

Now, a scanning probe microscope D according to a fourth embodiment of the present invention is described with reference to the drawings. The scanning probe microscope D according to the fourth embodiment is an apparatus configured to detect displacement of the cantilever 1 by a self-sensing method using a piezoresistor, and is different from the embodiments described above in that the cantilever 1 is thermally deformed with the use of the above-mentioned piezoresistor provided to the cantilever 1.

Figure 13:
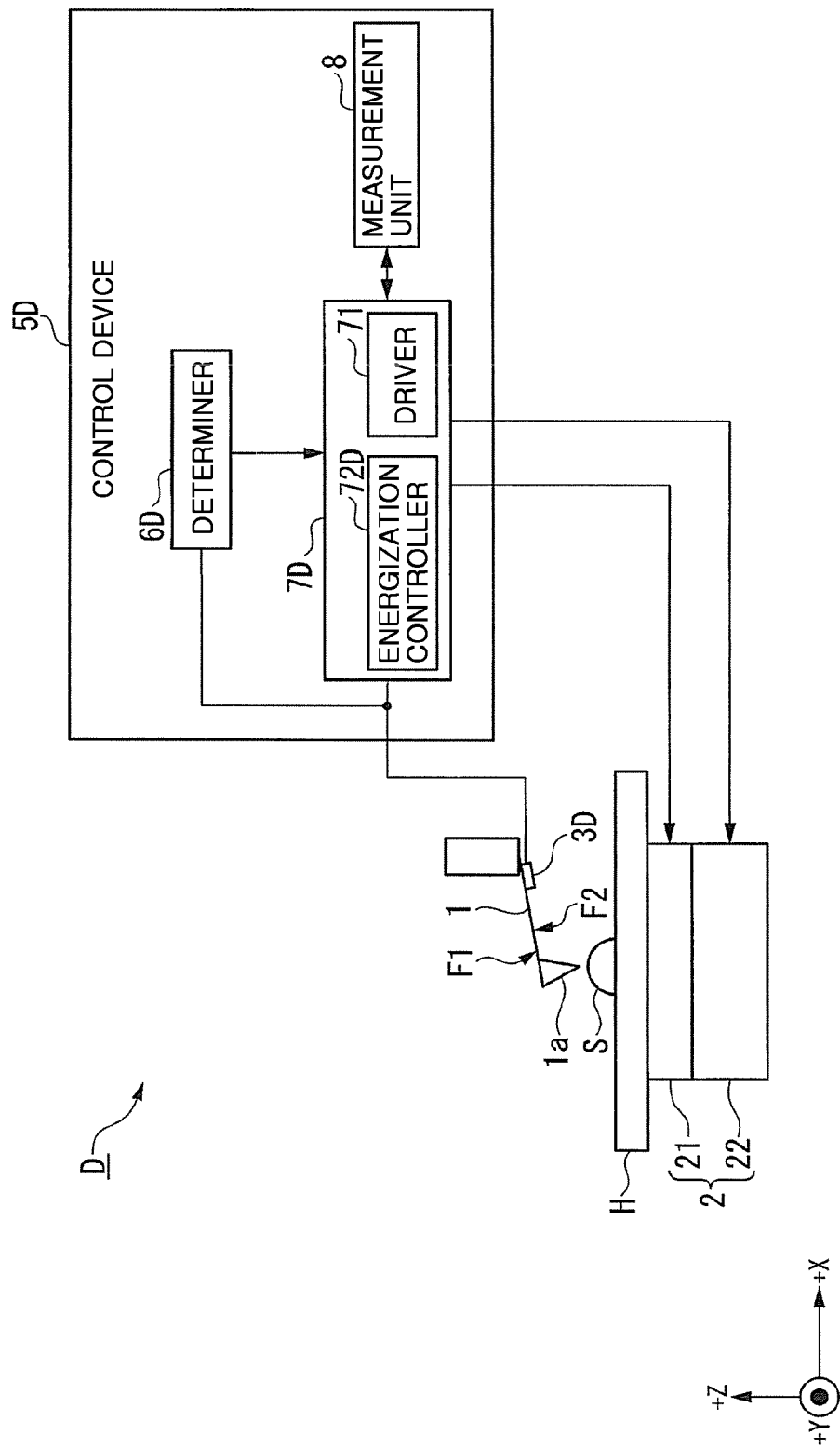
FIG. 13 is a diagram for illustrating an example of a schematic configuration of a scanning probe microscope (D) according to a fourth embodiment of the present invention.

FIG. 13 is a diagram for illustrating an example of a schematic configuration of the scanning probe microscope D according to the fourth embodiment. As illustrated in FIG. 13, the scanning probe microscope D includes a cantilever 1, a movement driver 2, a displacement detector 3D, and a control device 5D.

The displacement detector 3D is provided to the cantilever 1 to detect displacement of the deformation amount of the cantilever 1. The displacement detector 3D is configured to detect the displacement of the cantilever 1 not by the optical lever method but on the basis of a value of resistance of the piezoresistor. Now, a configuration of the displacement detector 3D is described with reference to FIG. 14.

Figure 14:
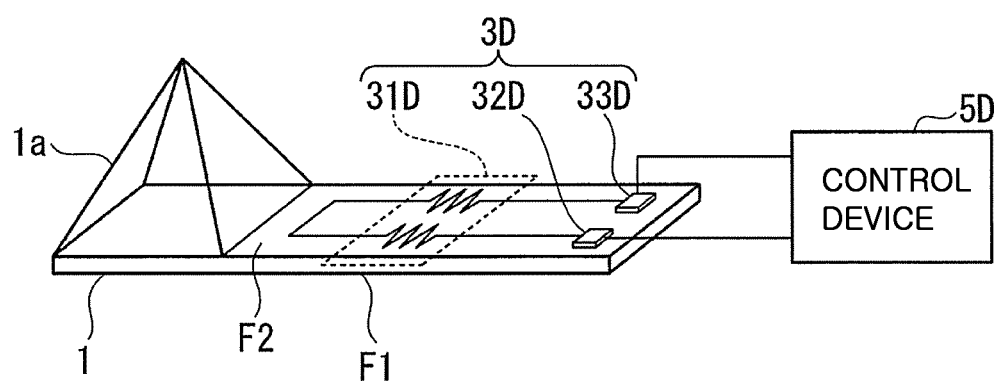
FIG. 14 is a diagram for illustrating an example of a schematic configuration of a displacement detector (3D) in the fourth embodiment.

As illustrated in FIG. 14, the displacement detector 3D includes a piezoresistor 31D, a first electrode 32D, and a second electrode 33D.

The piezoresistor 31D is provided on the front surface F2 of the cantilever 1. The piezoresistor 31D is changed in value of resistance depending on a displacement amount of the cantilever 1.

The first electrode 32D is provided on the front surface F2 of the cantilever 1, and is electrically connected to a first end of the piezoresistor 31D. The first electrode 32D is also electrically connected to the control device 5D.

The second electrode 33D is provided on the front surface F2 of the cantilever 1, and is electrically connected to a second end of the piezoresistor 31D. The second electrode 33D is also electrically connected to the control device 5D.

Next, the control device 5D in the fourth embodiment is described.

As illustrated in FIG. 13, the control device 5D includes a determiner 6D, a controller 7D, and a measurement unit 8.

The determiner 6D is connected to each of the first electrode 32D and the second electrode 33D. The determiner 6D is configured to determine whether the probe 1a is brought into contact with the sample surface by detecting the change in value of resistance of the piezoresistor 31D. In other words, the determiner 6D is configured to perform the contact determination processing on the basis of the change in value of resistance of the piezoresistor 31D.

Specifically, the determiner 6D detects an electric current (hereinafter referred to as a "displacement detection current") flowing through the piezoresistor 31D when a voltage is applied between the first electrode 32D and the second electrode 33D, and determines whether the probe 1a is brought into contact with the sample surface on the basis of the detected displacement detection current.

The controller 7D applies a suitable voltage between the first electrode 32D and the second electrode 33D.

Moreover, the controller 7D is configured to control a relative movement amount between the probe 1a and the sample S. As in the first embodiment, the scanning probe microscope D uses an intermittent measurement method, in which the sample surface is intermittently scanned by bringing the probe 1a into contact with only a plurality of preset measurement points on the sample surface. Therefore, the controller 7D is configured to control each of the following operations: an approaching operation of bringing the probe 1a closer to the measurement position; a separating operation of separating the probe 1a and the sample S from each other; and a movement operation of moving the probe 1a to above the next measurement position.

Now, a configuration of the controller 7D is described. The controller 7D includes a driver 71 and an energization controller 72D.

The energization controller 72D is configured to energize the piezoresistor 31D by applying the voltage between the first electrode 32D and the second electrode 33D. Moreover, the energization controller 72D is configured to control the voltage to be applied between the first electrode 32D and the second electrode 33D, to thereby to able to control the electric current to flow through the piezoresistor 31D. The piezoresistor 31D generates heat by being energized by the energization controller 72D. In other words, the front surface F2 of the cantilever 1 is heated and thermally deformed by being energized by the piezoresistor 31D. Therefore, the energization controller 72D can change a temperature of the front surface F2 of the cantilever 1 and thermally deform the front surface F2 by changing the voltage to be applied between the first electrode 32D and the second electrode 33D. In other words, the energization controller 72D is configured to control the voltage to be applied between the first electrode 32D and the second electrode 33D, to thereby control the deformation of the cantilever 1 due to the change in temperature thereof.

Figure 15:
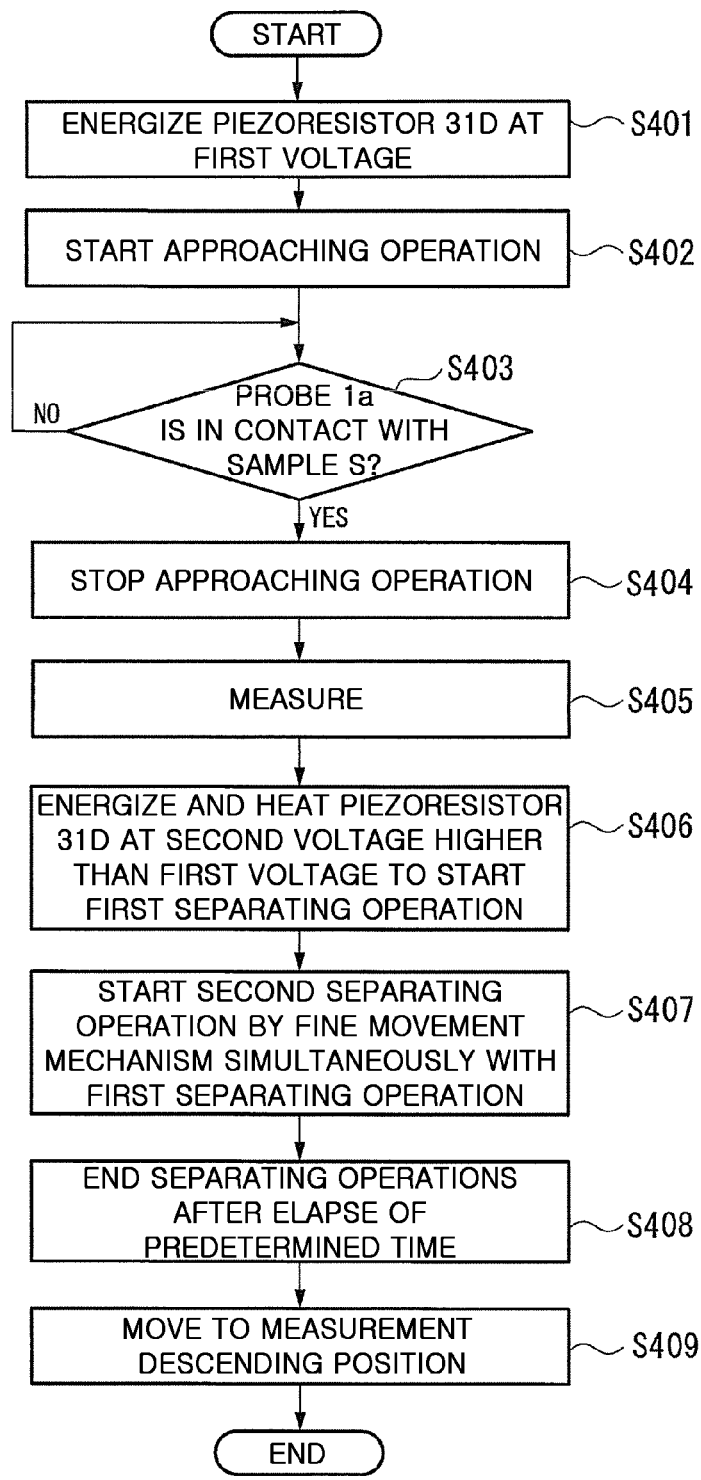
FIG. 15 is a flowchart for illustrating a flow of an intermittent measurement method of the scanning probe microscope (D) according to the fourth embodiment.

Now, a flow of the intermittent measurement method of the scanning probe microscope D according to the fourth embodiment is described with reference to FIG. 15. As the initial conditions, a case is assumed in which the probe 1a is positioned at a measurement descending position of a predetermined measurement point.

The energization controller 72D energizes the piezoresistor 31D by applying a first voltage between the first electrode 32D and the second electrode 33D (Step S401). The purpose of energizing the piezoresistor 31D by applying the first voltage is to generate the displacement detection current for detecting the displacement of the cantilever 1, and not to thermally deform the cantilever 1.

When the piezoresistor 31D is energized, the driver 71 outputs the approaching operation signal to the Z-direction drive unit 21 to start the approaching operation (Step S402).

When the approaching operation is started by the driver 71, the determiner 6D executes the contact determination processing, in which the electric current flowing through the piezoresistor 31D is detected as the displacement detection current, and it is determined whether the probe 1a is brought into contact with the sample surface on the basis of a value of the detected displacement detection current (Step S403).

When the determiner 6D determines that the probe 1a and the sample surface are brought into contact with each other, the driver 71 stops outputting the approaching operation signal to stop the approaching operation (Step S404). In this case, the probe 1a is in contact with the sample surface, and hence the cantilever is twisted or deformed by a predetermined amount or more. Then, the measurement unit 8 measures the irregular shapes on the sample surface by measuring the relative distance under the state in which the approaching operation is stopped (Step S405).

When the measurement of the relative distance by the measurement unit 8 is complete, the controller 7D starts the separating operation, in which the sample S and the probe 1a are separated from each other.

Specifically, the energization controller 72D applies a second voltage, which is higher than the first voltage, between the first electrode 32D and the second electrode 33D to energize and heat the piezoresistor 31D. As a result, an electric current that is larger than the displacement detection current is allowed to flow through the piezoresistor 31D, and the piezoresistor 31D generates heat. Therefore, the front surface F2 of the cantilever 1 is heated by the heat generated by the piezoresistor 31D, and is heated and expanded. As a result, the cantilever 1 is thermally deformed to be warped upward (+Z) toward the back surface F1 side, and the separating operation is started (Step S406).

The response speed of the thermal deformation is far faster than the response speed of the piezoelectric element. In other words, the response speed of the separating operation (first separating operation) through the thermal deformation of the cantilever 1 is far faster than the response speed of the separating operation (second separating operation) by the Z-direction drive unit 21 (fine movement mechanism). Therefore, in the fourth embodiment, not the Z-direction drive unit 21 but the piezoresistor 31D is energized and heated to thermally deform the self-sensing cantilever 1 and start the separating operation (first separating operation). As a result, the measurement time of the irregular shapes on the sample surface is reduced.

Simultaneously with the start of the first separating operation through the thermal deformation of the cantilever 1, the driver 71 outputs the separating operation signal to the Z-direction drive unit 21 to start the second separating operation, in which the sample S is moved in the direction of being separated from the probe 1a (Step S407). Even when both of the separations are started simultaneously, the operation is performed as follows: the separation through the thermal deformation, which is fast in response, leads, and the separation with the fine movement mechanism, which is slow in response, follows. Both of the above-mentioned separating operations are executed for the predetermined time, and are then ended (Step S408). The "predetermined time" is up to a timing when the Z fine movement mechanism responds by an amount that is equivalent to the deformation amount of the thermal deformation or more.

When the first separating operation and the second separating operation are stopped, the controller 7D outputs the drive signal to the XY scanner 22 to move the probe 1*a* to the measurement descending position located immediately above the next measurement position (Step S409). Then, the controller 7D performs the operation of from Step S401 to Step S409 also at the next measurement position. In other words, the scanning probe microscope D performs the operation of from Step S401 to Step S409 for each measurement point on the sample S, to thereby intermittently scan the sample surface.

As described above, the scanning probe microscope D according to the fourth embodiment executes the separating operation by thermally deforming the cantilever 1. As a result, the scanning probe microscope D provides an effect similar to the first embodiment that the measurement time is significantly reduced.

Moreover, the scanning probe microscope D according to the fourth embodiment is the apparatus configured to detect the displacement of the cantilever 1 by the self-sensing method using the piezoresistor, in which the heating device 4 is not provided, and the cantilever 1 is thermally deformed through energization and heating of the piezoresistor. As a result, it is not required to add the heating device 4 to thermally deform the cantilever 1, and the cost is thus reduced.

Moreover, in the scanning probe microscope D, the cantilever 1 may be configured such that an expansion coefficient of the front surface F2 is larger than a coefficient of thermal expansion of the back surface F1, for example. The front surface F2 may be set to have a coefficient of thermal expansion that is larger than that of the back surface F1 through formation of a layer of a good conductor having a coefficient of thermal expansion that is larger than that of the back surface F1 on the front surface F2 of the cantilever 1, for example. The back surface F1 is formed of Si, and the front surface F2 is formed of Al, for example. Wiring of the displacement detector 3D provided on the front surface F2 may be formed of Al, for example.

Although the embodiments of the present invention have been described in detail with reference to the drawings, the specific configurations are not limited to those of the embodiments, and the present invention also encompasses design modifications and the like without departing from the gist of the present invention.

What is claimed is:

1. A scanning probe microscope, comprising:
a cantilever having a probe attached thereto, the scanning probe microscope being configured to scan a sample surface by intermittently bringing the probe into contact only with a plurality of preset measurement points on the sample surface; and
a control device configured to perform a first operation of bringing the probe and the sample surface into contact with each other, a second operation of separating the probe and the sample surface from each other after the first operation, and a third operation of relatively moving the probe to a position above a next measurement position,
wherein the control device is configured to execute the second operation by thermally deforming the cantilever, and
wherein the control device is configured to perform the first operation, the second operation, and the third operation for each preset measurement point of the plurality of preset measurement points.

2. The scanning probe microscope according to claim 1, wherein the control device includes a fine movement mechanism configured to relatively move the probe and the sample surface by using a piezoelectric element, and
wherein the control device is configured to execute the second operation by using both the thermal deformation of the cantilever and the fine movement mechanism.

3. The scanning probe microscope according to claim 1, further comprising a first light illuminator configured to irradiate the cantilever with light,
wherein the control device is configured to thermally deform the cantilever by controlling an illumination intensity of the light with which the first light illuminator irradiates the cantilever during the second operation.

4. The scanning probe microscope according to claim 3, further comprising an optical lever displacement detector including a second light illuminator, which is configured to irradiate a first surface of the cantilever with laser light, to detect a displacement amount of the cantilever based on reflection of the laser light with which the second light illuminator irradiates the first surface,
wherein the second light illuminator also serves as the first light illuminator.

5. The scanning probe microscope according to claim 4, wherein the control device includes:
a determiner configured to determine whether the probe and the sample surface are brought into contact with each other based on the displacement amount of the cantilever, which is detected by the optical lever displacement detector, during the first operation; and
a controller configured to execute, after the determiner determines that the probe and the sample surface are brought into contact with each other, the second operation by setting an illumination intensity of the laser light of the second light illuminator weaker than an illumination intensity of the laser light in the first operation to thermally deform the cantilever.

6. The scanning probe microscope according to claim 5, wherein the first surface of the cantilever has a coefficient of thermal expansion that is larger than a coefficient of thermal expansion of a second surface of the cantilever, which is on a side opposite to the first surface.

7. The scanning probe microscope according to claim 4, further comprising a light control element configured to control an illumination intensity of the laser light with which the second light illuminator irradiates the first surface,
wherein the control device includes: a determiner configured to determine whether the probe and the sample surface are brought into contact with each other based on the displacement amount of the cantilever, which is detected by the optical lever displacement detector, during the first operation; and a controller configured to execute, after the determiner determines that the probe and the sample surface are brought into contact with each other, the second operation by controlling the light control element so that an illumination intensity of the laser light with which the second light illuminator irradiates the first surface is set weaker than an illumination intensity of the laser light in the first operation to thermally deform the cantilever.

8. The scanning probe microscope according to claim 7, wherein the first surface of the cantilever has a coefficient of thermal expansion that is larger than a coefficient of thermal expansion of a second surface of the cantilever, which is on a side opposite to the first surface.

9. The scanning probe microscope according to claim 1, wherein the cantilever includes a resistor, and
wherein the control device is configured to thermally deform the cantilever by energizing the resistor during the second operation.

10. The scanning probe microscope according to claim 1, wherein the cantilever includes a piezoresistor, and
wherein the control device includes: a determiner configured to determine whether the probe and the sample surface are brought into contact with each other based on a value of resistance of the piezoresistor during the first operation; and a controller configured to execute, after the determiner determines that the probe and the sample surface are brought into contact with each other, the second operation by energizing and heating the piezoresistor to thermally deform the cantilever.

11. A scanning method using a scanning probe microscope, the scanning probe microscope including a cantilever having a probe attached thereto to scan a sample surface by intermittently bringing the probe into contact only with a plurality of preset measurement points on the sample surface, the scanning method comprising:
 a first operation step of bringing the probe and the sample surface into contact with each other; and
 a second operation step of separating the probe and the sample surface from each other after the first operation step, and
 a third operation step of relatively moving the probe to a position above a next measurement position,
 wherein the second operation step includes separating the probe and the sample surface from each other through use of thermal deformation of the cantilever, and
 wherein the first operation step, the second operation step, and the third operation step are performed for each of the measurement point.

* * * * *